(12) United States Patent
Kamon et al.

(10) Patent No.: US 12,228,948 B2
(45) Date of Patent: Feb. 18, 2025

(54) IMAGING SYSTEM AND ROBOT SYSTEM

(71) Applicant: KAWASAKI JUKOGYO KABUSHIKI KAISHA, Kobe (JP)

(72) Inventors: Masayuki Kamon, Kobe (JP); Hirokazu Sugiyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 225 days.

(21) Appl. No.: 18/001,877

(22) PCT Filed: Jun. 15, 2021

(86) PCT No.: PCT/JP2021/022670
§ 371 (c)(1),
(2) Date: Dec. 15, 2022

(87) PCT Pub. No.: WO2021/256464
PCT Pub. Date: Dec. 23, 2021

(65) Prior Publication Data
US 2023/0239439 A1 Jul. 27, 2023

(30) Foreign Application Priority Data
Jun. 19, 2020 (JP) .................... 2020-106027

(51) Int. Cl.
*G05D 1/224* (2024.01)
*G05D 1/00* (2006.01)
(Continued)

(52) U.S. Cl.
CPC ......... *G05D 1/2247* (2024.01); *G05D 1/0094* (2013.01); *G05D 1/106* (2019.05);
(Continued)

(58) Field of Classification Search
None
See application file for complete search history.

(56) References Cited

U.S. PATENT DOCUMENTS

2018/0371723 A1* 12/2018 Nishi .................. G05D 1/0094
2019/0016569 A1   1/2019 Palberg et al.
(Continued)

FOREIGN PATENT DOCUMENTS

CN    108779629 A    11/2018
CN    110083241 A    8/2019
(Continued)

*Primary Examiner* — Peter D Nolan
*Assistant Examiner* — Michael F Whalen
(74) *Attorney, Agent, or Firm* — METROLEX IP LAW GROUP, PLLC; Robert L. Scoff, Esq.

(57) ABSTRACT

An imaging system includes: an unmanned flight vehicle; an imager that is mounted on the unmanned flight vehicle and takes an image of a robot which performs work with respect to a target object; a display structure which is located away from the unmanned flight vehicle and displays the image taken by the imager to a user who manipulates the robot; and circuitry which controls operations of the imager and the unmanned flight vehicle. The circuitry acquires operation related information that is information related to an operation of the robot. The circuitry moves the unmanned flight vehicle such that a position and direction of the imager are changed so as to correspond to the operation related information.

11 Claims, 10 Drawing Sheets

(51) Int. Cl.
*G05D 1/689* (2024.01)
*H04N 23/611* (2023.01)
*H04N 23/661* (2023.01)
*H04N 23/69* (2023.01)
*H04N 23/695* (2023.01)
*B64U 10/14* (2023.01)
*B64U 20/87* (2023.01)
*B64U 50/19* (2023.01)
*B64U 101/30* (2023.01)

(52) U.S. Cl.
CPC ........... *G05D 1/2248* (2024.01); *G05D 1/689* (2024.01); *H04N 23/611* (2023.01); *H04N 23/661* (2023.01); *H04N 23/69* (2023.01); *H04N 23/695* (2023.01); *B64U 10/14* (2023.01); *B64U 20/87* (2023.01); *B64U 50/19* (2023.01); *B64U 2101/30* (2023.01); *B64U 2201/20* (2023.01)

(56) References Cited

U.S. PATENT DOCUMENTS

| | | | |
|---|---|---|---|
| 2020/0015401 A1 | | 1/2020 | Frei et al. |
| 2020/0055195 A1* | | 2/2020 | Ignakov ................. B25J 13/06 |
| 2020/0104598 A1 | | 4/2020 | Qian et al. |
| 2020/0317335 A1* | | 10/2020 | Sugaya ................. G08G 5/006 |
| 2020/0376677 A1 | | 12/2020 | Hibino |

FOREIGN PATENT DOCUMENTS

| | | |
|---|---|---|
| JP | 2019-93471 A | 6/2019 |
| WO | 2017/131194 A1 | 8/2017 |
| WO | WO-2019102789 A1 * | 5/2019 .......... B25J 11/0075 |

\* cited by examiner

IMAGING SYSTEM AND ROBOT SYSTEM

CROSS-REFERENCE TO RELATED APPLICATIONS

This application is a national stage entry of International Application No. PCT/JP2021/022670 filed on Jun. 15, 2021, which claims priority based on the Article 8 of Patent Cooperation Treaty from prior Japanese Patent Application No. 2020-106027, filed on Jun. 19, 2020, the entire contents of all of which are incorporated herein by reference.

TECHNICAL FIELD

The present disclosure relates to an imaging system and a robot system.

BACKGROUND ART

There is a conventional technology that accepts remote control of a robot by a user who sees a monitor that displays an image of a target object which is taken by a camera. For example, PTL 1 discloses a robot system that displays an image of a robot on a monitor based on imaging data acquired by a drone that is an unmanned flight vehicle including a camera whose posture is changeable.

CITATION LIST

Patent Literature

PTL 1: Japanese Laid-Open Patent Application Publication No. 2019-93471

SUMMARY OF INVENTION

The robot system of PTL 1 includes: a robot operating unit for manipulating the robot; and a flight vehicle operating unit for manipulating the drone. For example, when moving the drone while operating the robot, an operator needs to manipulate both the robot operating unit and the flight vehicle operating unit with his/her hands. However, manipulating both of these in parallel is difficult.

An object of the present disclosure is to provide an imaging system and a robot system each of which facilitates manipulation of an unmanned flight vehicle on which an imager is mounted.

Solution to Problem

An imaging system according to one aspect of the present disclosure includes: an unmanned flight vehicle; an imager that is mounted on the unmanned flight vehicle and takes an image of a robot which performs work with respect to a target object; a display structure that is located away from the unmanned flight vehicle and displays the image taken by the imager to a user who manipulates the robot; and a controller that controls operations of the imager and the unmanned flight vehicle. The controller acquires operation related information that is information related to an operation of the robot. The controller moves the unmanned flight vehicle such that a position and direction of the imager are changed so as to correspond to the operation related information.

DESCRIPTION OF EMBODIMENTS

Hereinafter, an exemplary embodiment of the present disclosure will be described with reference to the drawings. The exemplary embodiment described below is a comprehensive or specific example. Among components in the following exemplary embodiment, components that are not recited in independent claims which embody the broadest concept of the present disclosure will be described as optional components. The diagrams in the accompanying drawings are schematic diagrams and are not necessarily strictly drawn. In the diagrams, the same reference signs are used for the substantially identical components, and the repetition of the same explanation may be avoided, or such explanation may be simplified. Moreover, in the present description and the claims, a "device" may denote not only a single device but also a system including devices.

Configuration of Robot System

Figure 1:
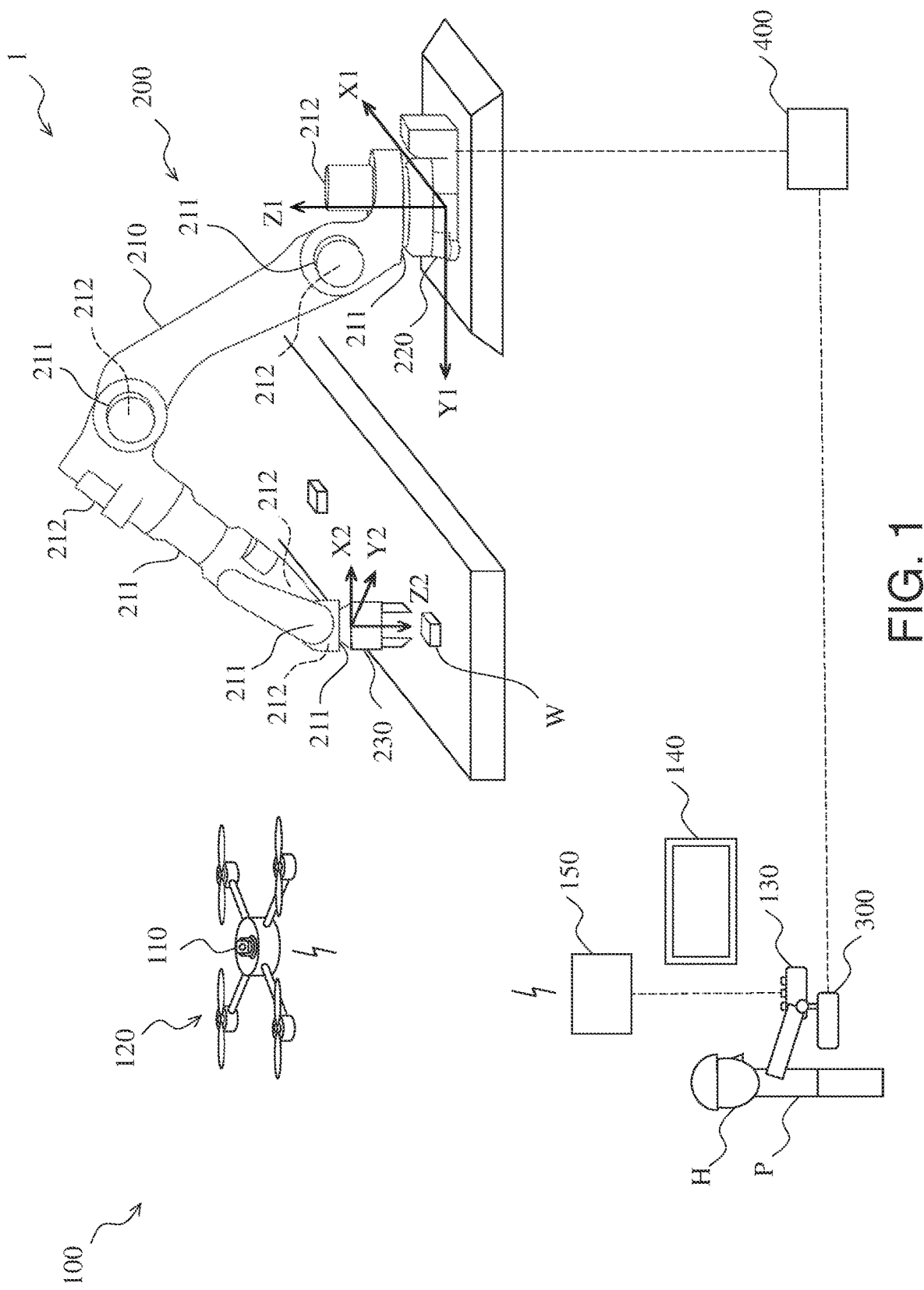
FIG. 1 is a perspective view showing one example of the configuration of a robot system according to an exemplary embodiment.

The configuration of a robot system 1 according to an exemplary embodiment will be described. FIG. 1 is a perspective view showing one example of the configuration of the robot system 1 according to the exemplary embodiment. As shown in FIG. 1, the robot system 1 includes an imaging system 100, a robot 200, a robot manipulating apparatus 300, and a robot controller 400. The imaging system 100 includes an imager 110, an unmanned flight vehicle 120, an imaging inputter 130, a display structure 140, and an imaging controller 150.

In the present exemplary embodiment, the robot 200 is an industrial robot and includes a robotic arm 210, a base 220, and an end effector 230. However, the present exemplary embodiment is not limited to this. The robot 200 may be another type of robot, such as a service robot, a medical robot, a drug development robot, or a humanoid. The service robot is a robot used in various service industries, such as care giving, medical care, cleaning, security, guidance, rescue, cooking, and product offerings.

The base 220 is fixed to a supporting surface and supports the robotic arm 210. The supporting surface for the base 220 may be an immovable surface, such as a floor surface, or may be a movable surface on movable equipment, such as travelling equipment. The robotic arm 210 includes at least one joint 211 and has at least one degree of freedom. The robotic arm 210 includes joint drivers 212 that drive the respective joints 211. The joint drivers 212 include servomotors as electric motors that drive the joints 211. Each servomotor includes: an encoder that detects a rotation amount of the servomotor; and an electric current sensor that detects an electric current value of the servomotor. In the servomotor, the electric current sensor is not essential.

The robotic arm 210 is configured such that the end effector 230 is attached to a tip of the robotic arm 210. The robotic arm 210 can move the end effector 230 so as to freely change the position and posture of the end effector 230. The end effector 230 is configured such that the end effector 230 can apply various actions, such as holding, suction, spraying of a liquid such as paint, welding, and injection of a sealing agent, to a target object (also called "workpiece") W in accordance with the use purpose of the end effector 230.

In the present exemplary embodiment, the robotic arm 210 is a vertical articulated robotic arm including six rotary joints 211 and having six degrees of freedom. However, the present exemplary embodiment is not limited to this. The type of the robotic arm 210 may be any type and may be, for example, a horizontal articulated type, a polar coordinate type, a cylindrical coordinate type, or a rectangular coordinate type. Each joint 211 of the robotic arm 210 may be any joint, such as a linear motion joint. The number of joints 211 of the robotic arm 210 may be any number, such as five or less or seven or more.

The robot manipulating apparatus 300 is at a position away from the robot 200 and is used to manipulate the robot 200 by remote control. The robot manipulating apparatus 300 may be located at such a position that a user P who manipulates the robot manipulating apparatus 300 can directly see the robot 200 or may be located at such a position that the user P cannot directly see the robot 200. For example, the robot manipulating apparatus 300 may be located in a space isolated from a space where the robot 200 is located or may be located in a space away from the space where the robot 200 is located.

The robot manipulating apparatus 300 receives input, such as various commands, information, and data, and outputs the input to the robot controller 400. For example, the robot manipulating apparatus 300 can receive the input from the user P. For example, the robot manipulating apparatus 300 is connected to other equipment and can receive the input from the equipment. For example, the robot manipulating apparatus 300 may include known input means, such as a lever, a button, a touch panel, a joystick, a motion capture, a camera, and a microphone. For example, the robot manipulating apparatus 300 may include terminal equipment such as a teaching pendant that is one of teaching equipment, a smart device that is for example a smartphone or a tablet, a personal computer, and dedicated terminal equipment. For example, when the robot 200 is controlled in a master-slave mode, the robot manipulating apparatus 300 may include a master device. For example, the master device may be able to perform the same or similar operation as or to the robotic arm 210.

The robot controller 400 controls the operation of the robot 200. The robot controller 400 is connected to the robot 200 and the robot manipulating apparatus 300 through wired communication or wireless communication. Any wired communication and any wireless communication may be used. The robot controller 400 processes commands, information, data, and the like which are input through the robot manipulating apparatus 300. The robot controller 400 may be connected to an external device and receive and process input, such as commands, information, and data, from the external device.

For example, the robot controller 400 controls the operation of the robot 200 in accordance with the commands, the information, the data, and the like. The robot controller 400 controls the supply of, for example, power to the robot 200. The robot controller 400 manages, for example, information for managing the robot 200. For example, the robot controller 400 controls driving of the joint drivers 212 of the robotic arm 210 and driving of the end effector 230. The robot controller 400 determines rotational drive amounts of the joints 211 which are used to move the end effector 230 by the robotic arm 210. Then, the robot controller 400 drives the joint drivers 212 in accordance with the determined rotational drive amounts. Moreover, the robot controller 400 controls driving directions, driving amounts, driving speeds, driving acceleration, and driving torque of the joints 211 by using, as feedback information, the rotation amounts detected by the encoders of the servomotors of the joint drivers 212 and the electric current values detected by the electric current sensors of the servomotors of the joint drivers 212. With this, the robot controller 400 causes the robotic arm 210 to move the end effector 230 to a desired position and a desired posture and apply desired force through the end effector 230. The robot controller 400 may acquire the electric current values of the servomotors from other means, such as circuitry that controls electric currents supplied to the servomotors.

The robot controller 400 outputs various commands, information, data, and the like to the robot manipulating apparatus 300 and/or the display structure 140 of the imaging system 100. For example, the robot controller 400 causes the display structure 140 to visually and/or audibly present various commands, information, data, and the like. For example, the robot controller 400 may output an image for manipulating the robot 200, an image showing a state of the robot 200, and an image for managing the robot 200.

The robot controller 400 includes a computer. Moreover, the robot controller 400 may include: electric circuitry that controls electric power supplied to the robot 200; equipment that controls power other than electric power, such as pneumatic pressure or liquid pressure, supplied to the robot 200; equipment that controls a material, such as cooling water or paint, supplied to the robot 200; and the like. The equipment other than the computer may be located separately from the robot controller 400.

Figure 2:
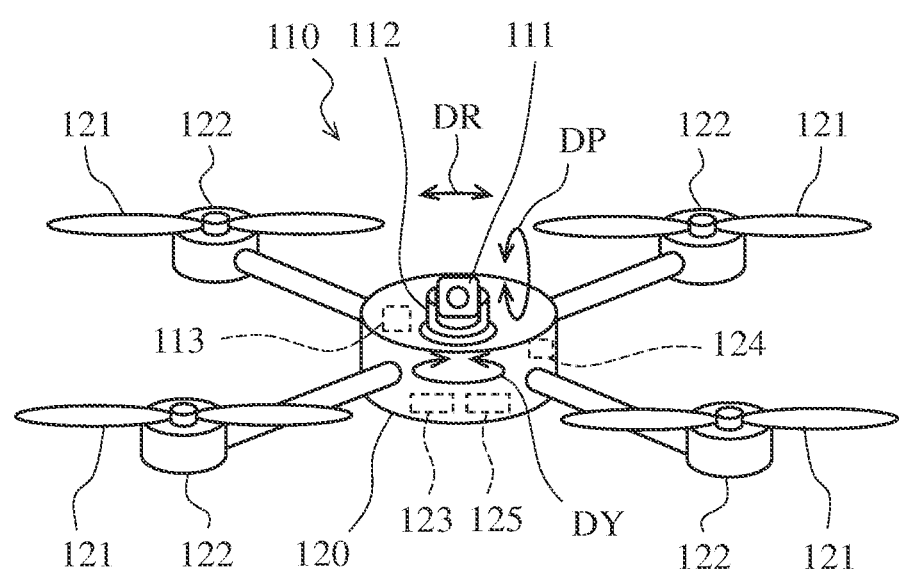
FIG. 2 is a perspective view showing one example of the configuration of an unmanned flight vehicle according to the exemplary embodiment.
Figure 3:
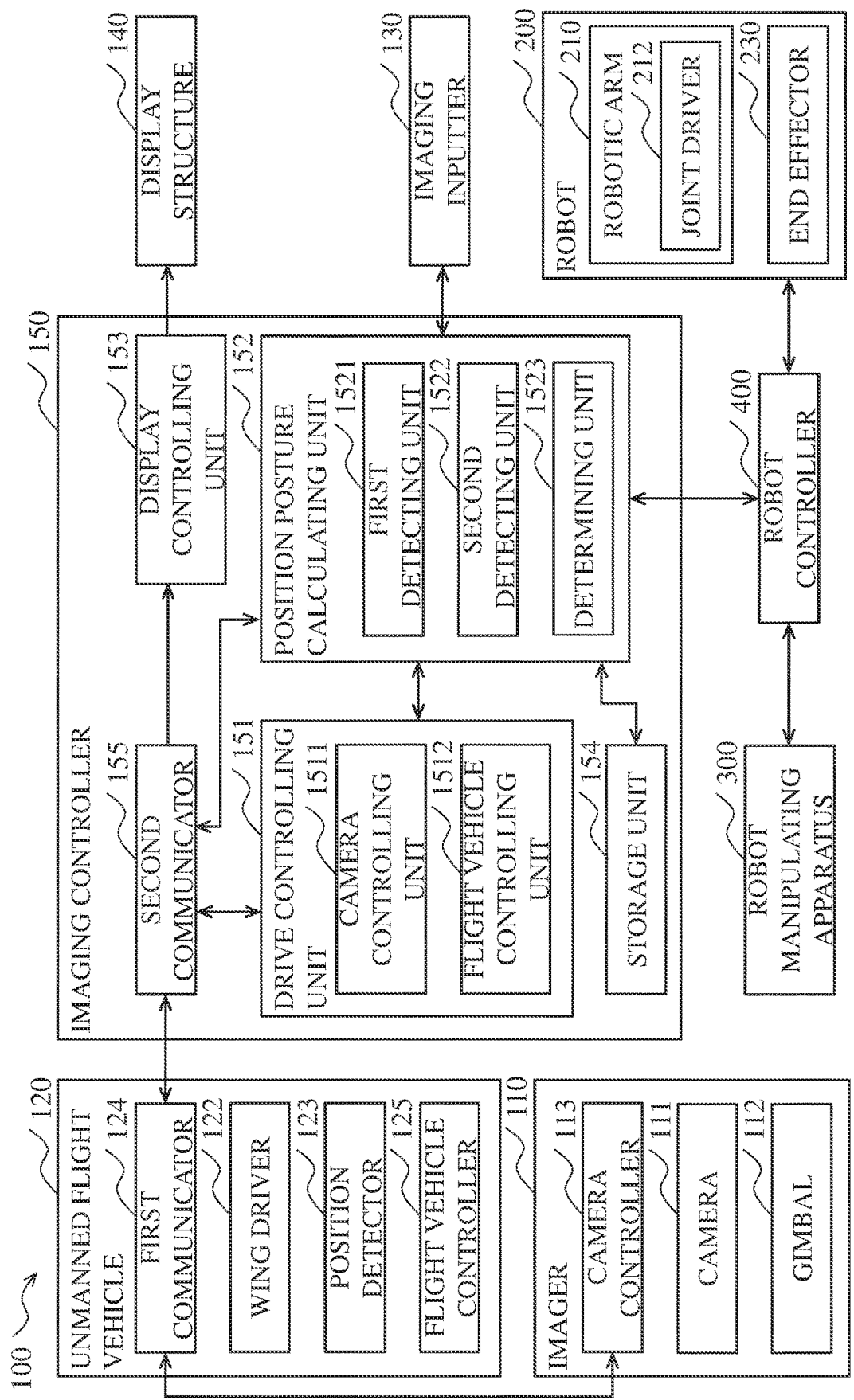
FIG. 3 is a block diagram showing one example of the functional configuration of an imaging system according to the exemplary embodiment.

FIG. 2 is a perspective view showing one example of the configuration of the unmanned flight vehicle 120 according to the exemplary embodiment. FIG. 3 is a block diagram showing one example of the functional configuration of the imaging system 100 according to the exemplary embodiment. As shown in FIGS. 1 to 3, the imager 110 of the imaging system 100 is mounted on the unmanned flight vehicle 120. The imager 110 includes: a camera 111 that takes a digital still image and/or a digital moving image; a gimbal 112 that supports the camera 111 on the unmanned flight vehicle 120; and a camera controller 113. In the present exemplary embodiment, the camera 111 is merely a visible light camera. However, the camera 111 may be another type of camera, such as a three-dimensional camera that takes a three-dimensional image including positional information of a subject in the image.

The gimbal 112 is attached to the unmanned flight vehicle 120, and the imager 110 is mounted on the gimbal 112. The gimbal 112 can operate so as to freely change the direction of the imager 110. In the present exemplary embodiment, the gimbal 112 is electrically operated and includes an electric motor for driving. The gimbal 112 may be able to change the posture of the imager 110 relative to the unmanned flight vehicle 120 in at least a yawing direction DY and at least a pitching direction DP. Moreover, the gimbal 112 may be able to change the posture of the imager 110 in a rolling direction DR. The direction of the imager 110 may be a direction of an optical axis center of the camera of the imager 110, and specifically, may be a three-dimensional direction of the optical axis center in a three-dimensional space. However, the present exemplary embodiment is not limited to this. For example, the direction of the imager 110 may correspond to the posture of the imager 110. Moreover, the position of the imager 110 may be a three-dimensional position of the imager 110 in a three-dimensional space.

The camera controller 113 controls driving of the camera 111 and the gimbal 112. The camera controller 113 controls the driving of the camera 111 and the gimbal 112 in accordance with information, commands, and the like received from the imaging controller 150 through wireless communication to operate the camera 111 and the gimbal 112 in accordance with the information, the commands, and the like. The camera controller 113 transmits operation information, which indicates the results of the operations of the camera 111 and the gimbal 112, to the imaging controller 150 through wireless communication. The camera controller 113 communicates with the imaging controller 150 through wireless communication by using a below-described first communicator 124 of the unmanned flight vehicle 120. The camera controller 113 includes a computer and electric circuitry that controls electric power supplied to the camera 111 and the gimbal 112.

The unmanned flight vehicle 120 can fly so as to freely change the position and direction of the imager 110 mounted on the unmanned flight vehicle 120. In the present exemplary embodiment, the unmanned flight vehicle 120 is a drone including rotary wings 121, for example, four rotary wings 121 which are planarly arranged on a flat plane and are rotatable in a direction along the flat plane. However, the present exemplary embodiment is not limited to this. The drone can perform: flight in any direction including a horizontal direction and a vertical direction; hovering in the air; changing of the posture toward any direction in a hovering state; and the like. Moreover, the unmanned flight vehicle 120 includes: wing drivers 122 that rotate the respective rotary wings 121; a position detector 123; the first communicator 124; and a flight vehicle controller 125.

One example of the wing driver 122 is an electric motor. The first communicator 124 performs wireless communication between the unmanned flight vehicle 120 and the imaging controller 150. Specifically, the first communicator 124 acts as an intermediary of wireless communication between the flight vehicle controller 125 and the imaging controller 150 and acts as an intermediary of wireless communication between the camera controller 113 of the imager 110 and the imaging controller 150. For example, the first communicator 124 may include communication circuitry.

The position detector 123 detects the position and posture of the unmanned flight vehicle 120 and outputs them to the flight vehicle controller 125. The configuration of the position detector 123 is not especially limited, may detect the position and posture of the unmanned flight vehicle 120, and may be, for example, known technology. For example, the position detector 123 may include: a position estimating system using the GPS (Global Positioning System); a position estimating system using radio wave other than the GPS; a position estimating system using image recognition technology; a position estimating system using acceleration and an angular velocity; another position estimating system; a combination of two or more among the above position estimating systems; or the like, and may detect the position and posture of the unmanned flight vehicle 120 using such position estimating system.

One example of the position estimating system using the GPS is a system that performs transmission and reception with the GPS to measure the position and posture of the unmanned flight vehicle 120. One example of the position estimating system using the radio wave other than the GPS is a system that estimates the position and posture of the unmanned flight vehicle 120 by the radio wave received from a radio wave transmitter located in a space where the robot 200 is located. One example of the position estimating system using the image recognition technology is a system that detects peripheral objects and the positions of the objects by image recognition using a three-dimensional camera to estimate the position and posture of the unmanned flight vehicle 120. One example of the position estimating system using the acceleration and the angular velocity is a system that estimates the position and posture of the unmanned flight vehicle 120 by using detection results of an acceleration sensor and an angular velocity sensor.

The flight vehicle controller 125 controls driving of the wing drivers 122. The flight vehicle controller 125 controls the driving of the wing drivers 122 in accordance with information, commands, and the like received from the imaging controller 150 through wireless communication using the first communicator 124 to cause the unmanned flight vehicle 120 to fly in accordance with the information, the commands, and the like. The flight vehicle controller 125 transmits information of the position and posture of the unmanned flight vehicle 120, which are detected by the position detector 123, to the imaging controller 150 through the first communicator 124. The flight vehicle controller 125 includes a computer and electric circuitry that controls electric power supplied to the wing drivers 122.

The unmanned flight vehicle 120 may have a structure for flying so as to freely change at least the position out of the position and the posture. For example, the unmanned flight vehicle 120 may have a structure such as a helicopter including two rotary wings that rotate in respective directions intersecting with each other. The unmanned flight vehicle 120 flies in accordance with the control of the imaging controller 150. For example, the unmanned flight vehicle 120 may fly in accordance with manipulation input to the imaging inputter 130. The unmanned flight vehicle 120 can automatically fly in accordance with program control of the imaging controller 150, i.e., can perform autonomous flight.

The imaging inputter 130 receives input, manipulation, and the like for operating the imaging system 100, from the user P. The imaging inputter 130 receives input, such as various commands, information, and data, and outputs them to the imaging controller 150. For example, the imaging inputter 130 receives input for manipulating the camera 111, the gimbal 112, and the unmanned flight vehicle 120 and outputs manipulation information, which indicates contents of the received manipulation, to the imaging controller 150. The imaging inputter 130 may be located in the vicinity of the robot manipulating apparatus 300 and may have the similar configuration to the above-described configuration of the robot manipulating apparatus 300. The robot manipulating apparatus 300 may include the imaging inputter 130 and also serve as the imaging inputter 130. The imaging inputter 130 is one example of an inputter.

The display structure 140 perceptibly presents the image, taken by the imager 110, to the user P. The display structure 140 is located in the vicinity of the robot manipulating apparatus 300 and is located at a position away from the imager 110. The display structure 140 may perceptibly present commands, information, data, and the like received from the robot controller 400, to the user P. For example, the display structure 140 includes a display, such as a liquid crystal display or an organic or inorganic EL display (Electro-Luminescence Display), and provides visual presentation. The display structure 140 may include a sound outputter, such as a speaker, and provide audible presentation. The display structure 140 may provide tactile presentation.

The imaging controller 150 is connected to the imager 110, the unmanned flight vehicle 120, the imaging inputter 130, and the display structure 140 through wired communication or wireless communication. Any wired communication and any wireless communication may be used. In the present exemplary embodiment, the imaging controller 150 is located outside the unmanned flight vehicle 120, communicates with the imager 110 and the unmanned flight vehicle 120 through wireless communication, and communicates with the imaging inputter 130 and the display structure 140 through wired communication. However, the imaging controller 150 may be mounted on the unmanned flight vehicle 120 and communicate with the imaging inputter 130 and the display structure 140 through wireless communication. The imaging controller 150 is one example of a controller.

The above imaging controller 150 includes a computer. Moreover, the imaging controller 150 may include, for example, electric circuitry that controls electric power supplied to the imaging inputter 130 and the display structure 140. Equipment other than the computer may be located separately from the imaging controller 150. The imaging controller 150 may be incorporated in the robot controller 400, the imaging inputter 130, or the robot manipulating apparatus 300 or may be located separately from the robot controller 400, the imaging inputter 130, and the robot manipulating apparatus 300.

For example, each of the computer of the robot controller 400 and the computer of the imaging controller 150 includes circuitry or processing circuitry including a processor, a memory, and the like. The circuitry or processing circuitry transmits or receives commands, information, data, and the like to or from other equipment. The circuitry or processing circuitry receives signals from various equipment and outputs control signals to control targets. The memory includes a storage device that is for example a semiconductor memory such as a volatile memory or a non-volatile memory; a hard disk or a SSD (Solid State Drive). For example, the memory stores programs executed by the circuitry or processing circuitry, various data, and the like.

The functions of circuitry or processing circuitry may be realized by a computer system including a processor such as a CPU (Central Processing Unit), a volatile memory such as a RAM (Random Access Memory), a non-volatile memory such as a ROM (Read-Only Memory), and the like. The computer system may realize the functions of the circuitry or processing circuitry in such a manner that the CPU uses the RAM as a work area and executes the programs stored in the ROM. Some or all of the functions of the circuitry or processing circuitry may be realized by the computer system, may be realized by a dedicated hardware circuit, such as an electronic circuit or an integrated circuit, or may be realized by the combination of the computer system and the hardware circuit. Each of the robot controller 400 and the imaging controller 150 may execute processing by centralized control performed by a single computer or may execute processing by distributed control performed by the cooperation of computers.

For example, the functions of the robot controller 400 and the imaging controller 150 may be realized by a microcontroller, a MPU (Micro Processing Unit), a LSI (Large Scale Integration), a system LSI, a PLC (Programmable Gate Array), a logic circuit, or the like. Each of the functions of the robot controller 400 and the functions of the imaging controller 150 may be realized by a single chip. Or, some or all of the functions of the robot controller 400 may be realized by a single chip, and some or all of the functions of the imaging controller 150 may be realized by a single chip. Moreover, each circuit may be a general circuit or a dedicated circuit. As the LSI, a FPGA (Field Programmable Gate Array) that is programmable after the manufacture of the LSI, a reconfigurable processor that can reconfigure the connection and/or setting of circuit cells inside the LSI, an ASIC (Application Specific Integrated Circuit) that is a single circuit obtained by integrating plural function circuits for a specific application, or the like may be utilized.

Functional Configuration of Imaging System

The functional configuration of the imaging system 100 will be described. As shown in FIG. 3, the imaging controller 150 of the imaging system 100 includes a drive controlling unit 151, a position posture calculating unit 152, a display controlling unit 153, and a storage unit 154 as functional components and further includes a second communicator 155. The drive controlling unit 151 includes a camera controlling unit 1511 and a flight vehicle controlling unit 1512 as functional components. The position posture calculating unit 152 includes a first detecting unit 1521, a second detecting unit 1522, and a determining unit 1523 as functional components.

The second communicator 155 communicates with the first communicator 124 of the unmanned flight vehicle 120 through wireless communication to act as an intermediary of wireless communication between the imaging controller 150 and the unmanned flight vehicle 120. For example, the second communicator 155 may include communication circuitry.

The function of the storage unit 154 is realized by a memory, etc., of the computer of the imaging controller 150. The functions of the functional components of the imaging controller 150 other than the storage unit 154 are realized by a processor, etc., of the computer.

The storage unit 154 can store various information, and the stored information can be read from the storage unit 154. For example, the storage unit 154 may store programs, various data, and the like. For example, the storage unit 154 may store programs, data, information, and the like for operating equipment of the imaging system 100.

The first detecting unit 1521 of the position posture calculating unit 152 detects the position and posture of the end effector 230 of the robot 200 and outputs them to the determining unit 1523. The first detecting unit 1521 detects the position and posture of a tip portion of the robotic arm 210 as the position and posture of the end effector 230. However, the present exemplary embodiment is not limited to this. The first detecting unit 1521 receives the feedback information of the joint drivers 212 of the robotic arm 210 from the robot controller 400. By using the rotational drive amounts of the joint drivers 212 which are contained in the feedback information, the first detecting unit 1521 calculates the position and posture of the tip portion of the robotic arm 210, the tip portion being a portion where the robotic arm 210 and the end effector 230 are connected to each other. For example, as shown in FIG. 1, the position of the tip portion of the robotic arm 210 may be shown by using a three-dimensional space coordinate system (hereinafter also called a "first coordinate system") set in a space where the robotic arm 210 is located. The first coordinate system is defined by coordinate axes X1, Y1, and Z1. The posture of the tip portion of the robotic arm 210 may be shown by using a three-dimensional space coordinate system (hereinafter also called a "second coordinate system") set at the tip portion as shown in FIG. 1. The second coordinate system is defined by coordinate axes X2, Y2, and Z2. The posture of the tip portion of the robotic arm 210 may be shown by using angles of the coordinate axes X2, Y2, and Z2 to the coordinate axes X1, Y1, and Z1 as posture angles. Herein, the feedback information of the joint drivers 212 of the robotic arm 210 and the information of the position and posture of the end effector 230 are examples of operation related information. The above feedback information is one example of the information of the position and posture of the end effector 230.

Herein, the operation related information is information related to the operation of the robot 200. The operation related information may contain information for operating the robot 200, information indicating the result of the operation of the robot 200, or both of these. To be specific, the operation related information may contain information indicating the operation of the robot 200. Examples of the information for operating the robot 200 include: information of manipulation input to the robot manipulating apparatus 300 or the like in order to operate the robot 200; and a command of a target operation output from the robot controller 400 to the robot 200 in order to operate the robot 200. Examples of the information indicating the result of the operation of the robot 200 include: the feedback information output from the robot 200; and a detection result of the operation of the robot 200 by a sensor or the like. The operation of the robot 200 may include the operation of the robotic arm 210, the operations of the joints of the robotic arm 210, the operations of the joint drivers 212 of the robotic arm 210, the position and posture of the end effector 230, the operation of the end effector 230, a combination of two or more of these, or the like.

The first detecting unit 1521 may detect the position and posture of the end effector 230 by using information of manipulation input to the robot manipulating apparatus 300 in order to operate the robotic arm 210, a command of a target operation output from the robot controller 400 to the robotic arm 210 in order to operate the robotic arm 210, or a combination of these.

The position and posture of the end effector 230 may be calculated by the robot controller 400, and the first detecting unit 1521 may receive a calculation result of the position and posture of the end effector 230 from the robot controller 400.

The second detecting unit 1522 detects the current position and current posture of the camera 111 of the imager 110 and outputs them to the determining unit 1523. The second detecting unit 1522 receives the information of the current position and current posture of the unmanned flight vehicle 120 and the operation information of the camera 111 and the gimbal 112 of the imager 110 from the unmanned flight vehicle 120 through wireless communication. The second detecting unit 1522 detects the position and posture of the camera 111 by using the received information. The position and posture of the camera 111 may be shown by the first coordinate system.

The determining unit 1523 determines a target position and target posture of the camera 111 of the imager 110 in accordance with the operation related information and outputs them to the drive controlling unit 151. Specifically, the determining unit 1523 determines the target position and target posture of the camera 111 such that the position and posture of the camera 111 change in accordance with the change of the operation related information. For example, the determining unit 1523 determines the target position and target posture of the camera 111 such that the position and posture of the camera 111 follows the movement of the robot 200 which is indicated by the operation related information. Specifically, the determining unit 1523 determines the target position and target posture of the camera 111 such that a relation between the position and posture of the end effector 230 and the position and posture of the camera 111 becomes a predetermined relative relation that is a predetermined relation.

The determining unit 1523 reads information indicating a relation of the position and posture of the camera 111 relative to the position and posture of the end effector 230 as the predetermined relative relation from the storage unit 154. By using the information of the above predetermined relative relation, the detection result of the position and posture of the end effector 230 from the first detecting unit 1521, and the detection result of the current position and current posture of the camera 111 from the second detecting unit 1522, the determining unit 1523 calculates the target position and target posture of the camera 111 which satisfy the predetermined relative relation with respect to the detection result of the position and posture of the end effector 230. The target position and the target posture may be shown by the first coordinate system. With this, the position and posture of the camera 111 relative to the end effector 230 may be maintained.

Herein, the determining unit 1523 determines the predetermined relative relation in accordance with a command input to the imaging inputter 130 by the user P. For example, in a case where the above command is input to the imaging inputter 130 when the position and posture of the end effector 230 are in a first state, and the position and posture of the camera 111 are in a second state, the determining unit 1523 sets a relation between the first state and the second state as the predetermined relative relation, calculates information indicating the relation, such as a relational expression of the position and posture of the end effector 230 and the position and posture of the camera 111, and stores the information in the storage unit 154.

Moreover, when manipulation for moving the position and posture of the camera 111 is input to the imaging inputter 130 by the user P, the determining unit 1523 receives manipulation information indicating contents of the manipulation from the imaging inputter 130 and determines the target position and target posture of the camera 111 to be moved in accordance with the manipulation information. Information of a relation between the manipulation information and the position and posture of the camera 111 is prestored in the storage unit 154, and the determining unit 1523 calculates the target position and the target posture by using the information. The manipulation information contains information of manipulation executed by the user P with respect to the operating robot 200 in order that the user P visually confirms a portion of the robot 200, such as the end effector 230, through the camera 111.

When the determining unit 1523 receives the manipulation information of the camera 111 from the imaging inputter 130 during execution of the control of determining the target position and target posture of the camera 111 by using the predetermined relative relation, the determining unit 1523 may prioritize the control of determining the target position and target posture of the camera 111 in accordance with the manipulation information. To be specific, the determining unit 1523 receives the manipulation information of the camera 111 from the imaging inputter 130 as a correction command that is a command to correct the position and direction of the camera 111, and the determining unit 1523 changes the target position and target direction of the camera 111 which correspond to the predetermined relative relation to the target position and target direction of the camera 111 which are determined in accordance with the manipulation information. With this, the target position and target posture of the camera 111 which are determined by using the predetermined relative relation are corrected by the target position and target posture of the camera 111 which are determined in accordance with the manipulation information. To be specific, the user P can correct the target position and target posture of the camera 111 by using the imaging inputter 130.

The determining unit 1523 may use the target position and target posture of the camera 111 which are determined in accordance with the manipulation information instead of the target position and target posture of the camera 111 which are determined by using the predetermined relative relation, and may determine the target position and target posture of the camera 111 which are determined in accordance with the manipulation information, as the corrected target position and corrected target posture of the camera 111. The determining unit 1523 may determine, as the corrected target position and corrected target posture of the camera 111, the target position and target posture of the camera 111 which are generated by adding the target position and target posture of the camera 111 which are determined in accordance with the manipulation information to the target position and target posture of the camera 111 which are determined by using the predetermined relative relation.

After the correction of the target position and target direction of the camera 111, the determining unit 1523 may reflect the result of the correction on the determination of the target position and target direction of the camera 111 which correspond to the predetermined relative relation. For example, the determining unit 1523 may modify the predetermined relative relation such that the result of the correction is reflected on the predetermined relative relation. Or, after the correction of the target position and target direction of the camera 111, the determining unit 1523 may determine the target position and target posture of the camera 111 without reflecting the result of the correction on the predetermined relative relation.

The flight vehicle controlling unit 1512 of the drive controlling unit 151 generates an operation command for the unmanned flight vehicle 120, the operation command being a command that causes the unmanned flight vehicle 120 to move the camera 111 in accordance with the target position and target posture of the camera 111 which are received from the determining unit 1523. The flight vehicle controlling unit 1512 outputs the operation command to the camera controlling unit 1511 and the flight vehicle controller 125 of the unmanned flight vehicle 120. The operation command contains a command of the target position and target posture of the unmanned flight vehicle 120, and the target position and the target posture may be shown by the first coordinate system. For example, the target position of the unmanned flight vehicle 120 may be such a position that the position of the camera 111 is moved to the target position. The target posture of the unmanned flight vehicle 120 may be such a posture that the direction of the camera 111 approaches the target posture. Since the unmanned flight vehicle 120 is the drone, the unmanned flight vehicle 120 is rotatable in the horizontal direction, and therefore, the direction of the camera 111 can be changed to the horizontal direction.

The camera controlling unit 1511 generates an operation command for the gimbal 112, the operation command being a command that causes the gimbal 112 to move the posture of the camera 111 in accordance with the target posture of the camera 111 which is received from the determining unit 1523. The operation command contains a command of the operations of respective portions of the gimbal 112. The camera controlling unit 1511 transmits the operation command to the camera controller 113 of the unmanned flight vehicle 120. Based on the information of the target posture of the unmanned flight vehicle 120 which is received from the flight vehicle controlling unit 1512 and the information of the target posture of the camera 111, the camera controlling unit 1511 determines the target posture of the camera 111 relative to the unmanned flight vehicle 120 and determines the operations of the respective portions of the gimbal 112 which realize the target posture. For example, the camera controlling unit 1511 determines the target posture of the camera 111 relative to an attaching portion of the gimbal 112 attached to the unmanned flight vehicle 120. When the camera 111 is mounted on equipment that can move the position and posture of the camera 111, the camera controlling unit 1511 may determine the target position and target posture of the camera 111 relative to the unmanned flight vehicle 120 and output them to the camera controller 113.

Moreover, the camera controlling unit 1511 generates an operation command for operating the camera 111, and transmits the operation command to the camera controller 113 of the unmanned flight vehicle 120. The operation command may include: a command of start or stop of imaging of the camera 111; a command of zoom-up imaging or zoom-back imaging of the camera 111; or the like.

The display controlling unit 153 receives image data, taken by the imager 110, from the imager 110, outputs the image data to the display structure 140, and causes the display structure 140 to display an image corresponding to the image data. The display controlling unit 153 may perform image processing of the image data received from the imager 110 and output the processed image data to the display structure 140.

Operation of Imaging System

Figure 4:
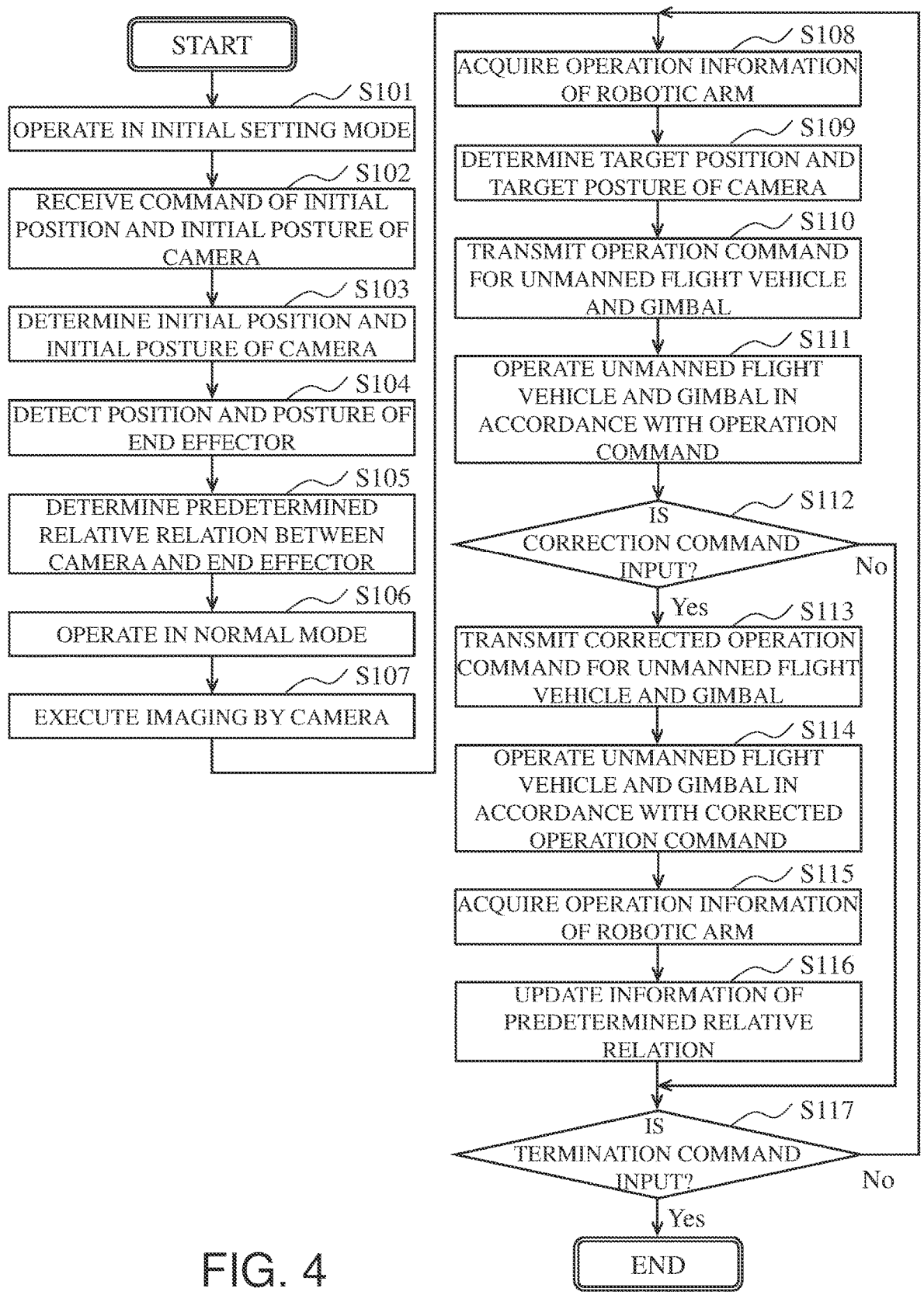
FIG. 4 is a flowchart showing one example of the operation of the imaging system according to the exemplary embodiment.

The operation of the imaging system 100 according to the exemplary embodiment will be described. FIG. 4 is a flowchart showing one example of the operation of the imaging system 100 according to the exemplary embodiment. First, in Step S101, the imaging controller 150 operates in an initial setting mode in which the predetermined relative relation between the end effector 230 of the robot 200 and the camera 111 of the imager 110 is determined. For example, the imaging controller 150 starts the initial setting mode in accordance with a start-up command which is input to the imaging inputter 130 by the user P.

Next, in Step S102, the imaging controller 150 receives a command to determine an initial position and initial posture of the camera 111 of the imager 110. Specifically, the imaging controller 150 starts up the imager 110 and the unmanned flight vehicle 120 and operates the imager 110 and the unmanned flight vehicle 120 in accordance with manipulation input to the imaging inputter 130. While visually confirming on the display structure 140 the image taken by the imager 110, the user P manipulates the imaging inputter 130 to cause the unmanned flight vehicle 120 to change the position and posture of the camera 111 and cause the gimbal 112 of the imager 110 to change the posture of the camera 111. For example, when a desired image, such as a desired image of the end effector 230, is displayed on the display structure 140, the user P inputs to the imaging inputter 130 a command to determine the current position and current posture of the camera 111 as the initial position and initial posture of the camera 111.

Next, in Step S103, the imaging controller 150 determines the initial position and initial posture of the camera 111. During the execution of the control, the imaging controller 150 receives the information of the position and posture of the unmanned flight vehicle 120 and the operation information of the camera 111 and the gimbal 112 from the unmanned flight vehicle 120 and the imager 110. The imaging controller 150 detects the position and posture of the camera 111 from the operation information of the gimbal 112 and the information of the position and posture of the unmanned flight vehicle 120 which are detected when the command to determine the initial position and initial posture of the camera 111 is received in Step S102. Then, the imaging controller 150 determines the detected position and the detected posture as the initial position and the initial posture.

Next, in Step S104, the imaging controller 150 detects the position and posture of the end effector 230. When the imaging controller 150 receives in Step S102 the command to determine the initial position and initial posture of the camera 111, the imaging controller 150 outputs to the robot controller 400 a command that requests the operation information of the robotic arm 210 as the information of the position and posture of the end effector 230. The robot controller 400 outputs the operation information to the imaging controller 150. The operation information of the robotic arm 210 is information of the rotation amounts of the joints 211 detected by the joint drivers 212 of the robotic arm 210. The imaging controller 150 calculates the position and posture of the end effector 230 by using the operation information of the robotic arm 210.

Next, in Step S105, by using the information of the initial position and initial posture of the camera 111 and the information of the position and posture of the end effector 230, the imaging controller 150 determines, for example, a relational expression indicating the predetermined relative relation, i.e., determines the predetermined relative relation. The imaging controller 150 stores the information of the predetermined relative relation in the storage unit 154.

Next, in Step S106, the imaging controller 150 terminates the initial setting mode and starts operating in a normal operating mode.

Next, in Step S107, the imaging controller 150 starts an imaging operation of the camera 111 of the imager 110. The camera 111 continuously takes a moving image and transmits the moving image to the imaging controller 150, and the imaging controller 150 causes the display structure 140 to display the moving image.

Next, in Step S108, the imaging controller 150 requests the operation information of the robotic arm 210 to the robot controller 400 and acquires the operation information from the robot controller 400.

Next, in Step S109, the imaging controller 150 determines the target position and target posture of the camera 111 which satisfy the predetermined relative relation with respect to the position and posture of the end effector 230. The imaging controller 150 calculates the position and posture of the end effector 230 by using the operation information of the robotic arm 210. The imaging controller 150 calculates the target position and target posture of the camera 111 by using the position and posture of the end effector 230 and the information of the predetermined relative relation stored in the storage unit 154.

Next, in Step S110, the imaging controller 150 determines the target position and target posture of the unmanned flight vehicle 120 and target operating states of the respective portions of the gimbal 112 which are used to move the camera 111 to the target position and the target posture. The imaging controller 150 transmits an operation command that causes the unmanned flight vehicle 120 to move to the target position and the target posture and an operation command that causes the gimbal 112 to operate into the target operating state, to the unmanned flight vehicle 120 and the imager 110.

Next, in Step S111, the unmanned flight vehicle 120 moves to the target position and the target posture in accordance with the operation command, and the imager 110 operates the gimbal 112 into the target operating state. With this, the position and posture of the camera 111 and the position and posture of the end effector 230 satisfy the relative positional relation.

Next, in Step S112, the imaging controller 150 determines whether or not a correction command that is a command to move the position and posture of the camera 111 has been input to the imaging inputter 130 by the user P. When the correction command has already been input (Yes in Step S112), the imaging controller 150 proceeds to Step S113. When the correction command has not yet been input (No in Step S112), the imaging controller 150 proceeds to Step S117.

In Step S113, the imaging controller 150 determines the corrected target position and corrected target posture of the unmanned flight vehicle 120 and the corrected target operating states of the respective portions of the gimbal 112 which are used to move the position and posture of the camera 111 in accordance with the correction command. The imaging controller 150 transmits a corrected operation command that is an operation command that causes the unmanned flight vehicle 120 to move to the corrected target position and the corrected target posture and a corrected operation command that is an operation command that causes the gimbal 112 to operate into the corrected target operating state, to the unmanned flight vehicle 120 and the imager 110. At this time, the imaging controller 150 may generate the operation command by using the information of the position and posture of the unmanned flight vehicle 120 and the information of the operating state of the gimbal 112 as the feedback information.

Next, in Step S114, the unmanned flight vehicle 120 moves to the corrected target position and the corrected target posture in accordance with the corrected operation command, and the imager 110 operates the gimbal 112 in the corrected target operating state. At this time, the unmanned flight vehicle 120 and the imager 110 may perform operation control by using the information of the position and posture of the unmanned flight vehicle 120 and the information of the operating state of the gimbal 112 as the feedback information.

Next, in Step S115, the imaging controller 150 requests the operation information of the robotic arm 210 to the robot controller 400 and acquires the operation information from the robot controller 400.

Next, in Step S116, the imaging controller 150 calculates the position and posture of the end effector 230 by using the operation information of the robotic arm 210. The imaging controller 150 determines, for example, a relational expression indicating a new predetermined relative relation by using the information of the position and posture of the end effector 230 and the corrected target position and corrected target posture of the camera 111. The imaging controller 150 updates the information of the predetermined relative relation by changing the information of the predetermined relative relation stored in the storage unit 154 to the information of the new predetermined relative relation. With this, the imaging controller 150 controls the position and posture of the camera 111 thereafter such that the position and posture of the camera 111 and the position and posture of the end effector 230 satisfy the updated relative positional relation.

Next, in Step S117, the imaging controller 150 determines whether or not a command to terminate the operation of the imaging system 100 has been input to the imaging inputter 130 by the user P. When the command has already been input (Yes in Step S117), the imaging controller 150 terminates the processing. When the command has not yet been input (No in Step S117), the imaging controller 150 returns to Step S108.

Through Steps S101 to S117, the imaging controller 150 determines a relative positional relation desired by the user P. The imaging controller 150 controls the operations of the unmanned flight vehicle 120 and the gimbal 112 to control the position and posture of the camera 111 such that the position and posture of the camera 111 and the position and posture of the end effector 230 satisfy the relative positional relation. Moreover, the imaging controller 150 corrects the relative positional relation in accordance with manipulation input to the imaging inputter 130. With this, the imaging controller 150 can determine the relative positional relation that is further desirable for the user P.

In the exemplary embodiment, when the imaging controller 150 receives the correction command of the position and posture of the camera 111 through the imaging inputter 130 during the control of the operations of the unmanned flight vehicle 120 and the gimbal 112 in accordance with the relative positional relation, the imaging controller 150 corrects the relative positional relation in accordance with the correction command. However, the exemplary embodiment is not limited to this. For example, the imaging controller 150 may be configured to correct the position and posture of the camera 111 in accordance with the correction command but not to correct the relative positional relation. In this case, the imaging controller 150 temporarily corrects the position and posture of the camera 111 in accordance with the correction command, and then, controls the position and posture of the camera 111 in accordance with the existing relative positional relation. Moreover, the imaging controller 150 may determine the presence or absence of the correction of the relative positional relation in accordance with a command of the user P through the imaging inputter 130.

Modified Example 1

Modified Example 1 of the exemplary embodiment is different from the exemplary embodiment in that the imaging controller 150A restricts a flight area of the unmanned flight vehicle 120. Hereinafter, in Modified Example 1, differences from the exemplary embodiment will be mainly described, and the same explanations as the exemplary embodiment are suitably omitted.

Figure 5:
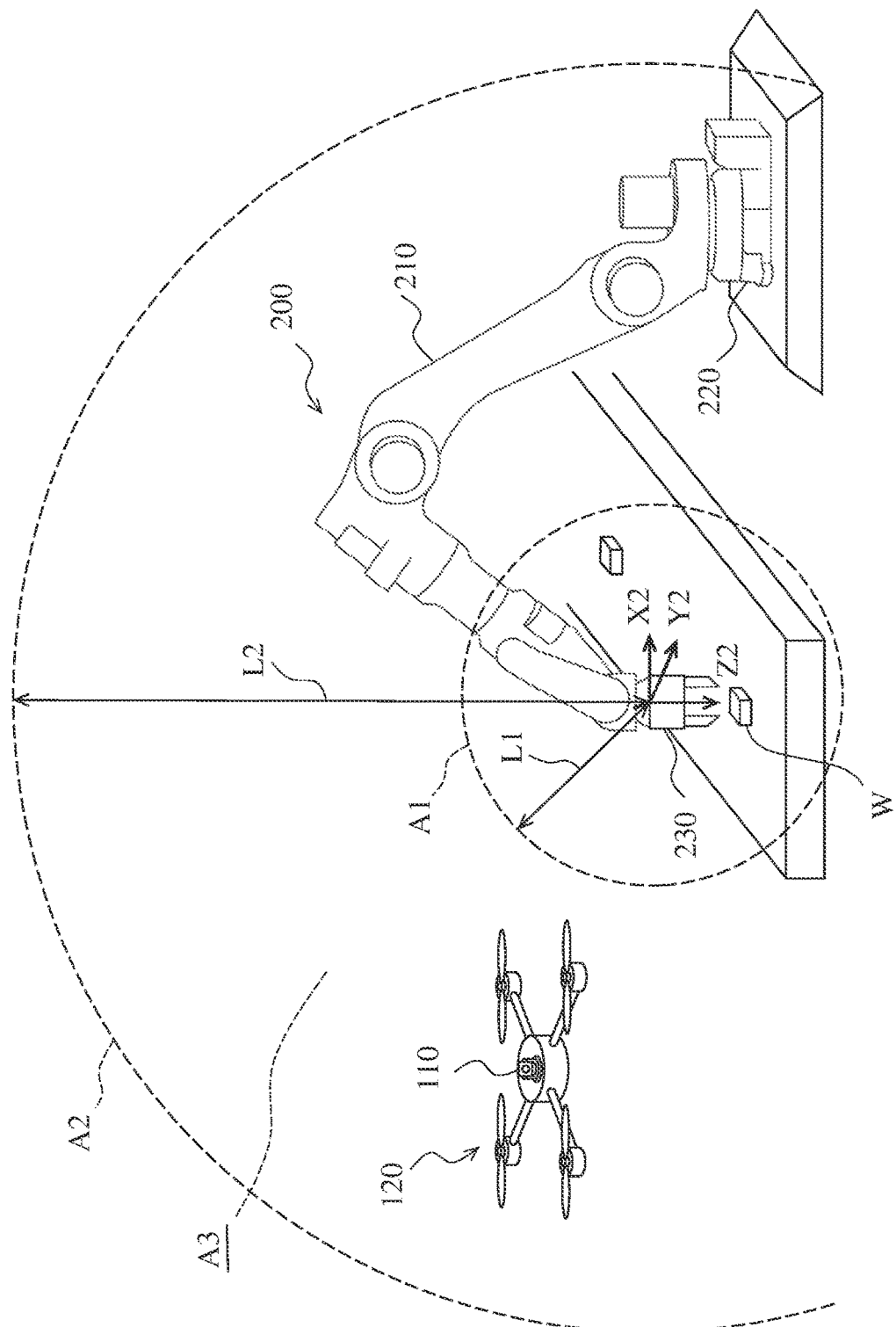
FIG. 5 is a perspective view showing one example of the configuration of the robot system according to Modified Example 1 of the exemplary embodiment.
Figure 6:
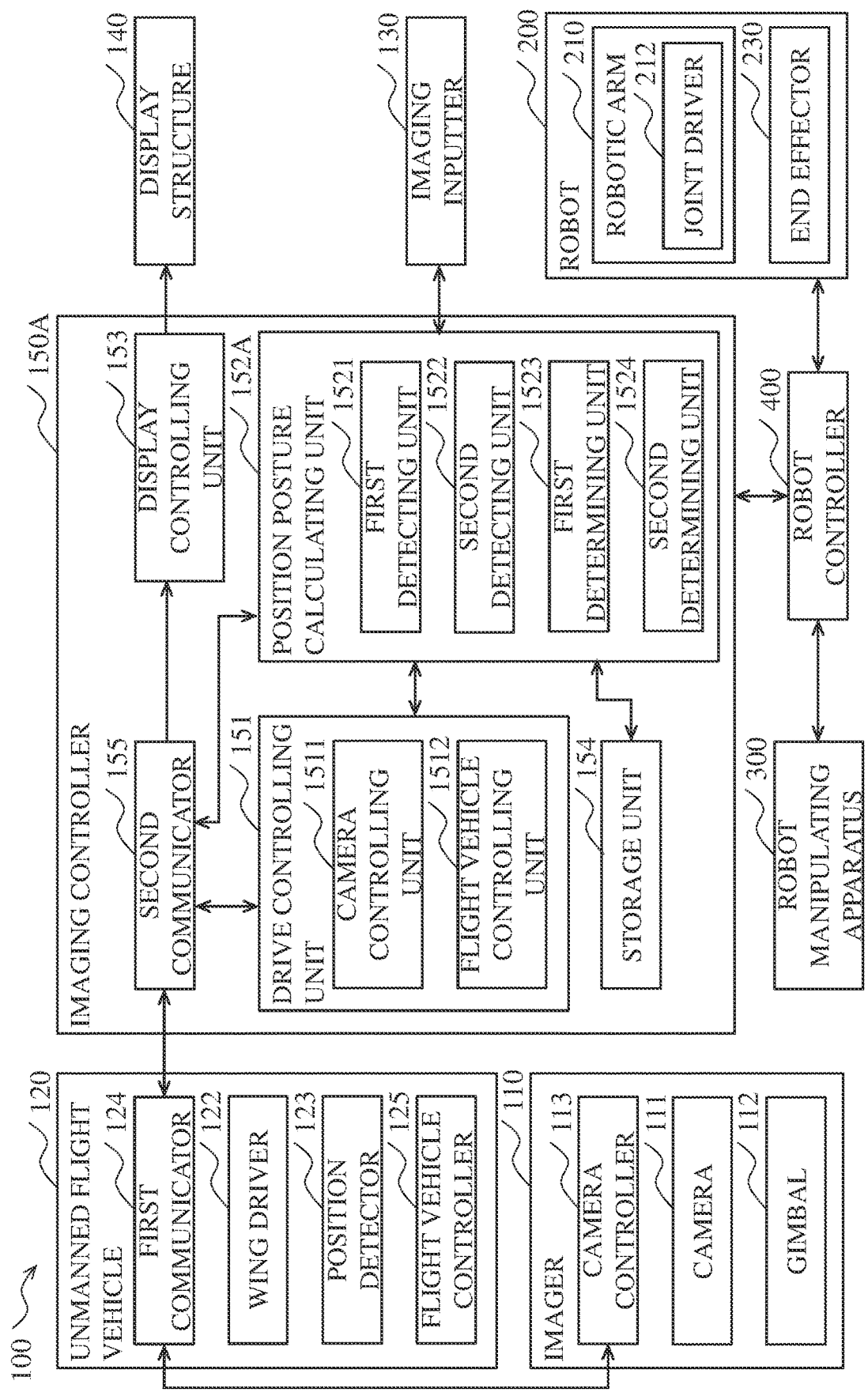
FIG. 6 is a block diagram showing one example of the functional configuration of the imaging system according to Modified Example 1.

FIG. 5 is a perspective view showing one example of the configuration of the robot system 1 according to Modified Example 1 of the exemplary embodiment. FIG. 6 is a block diagram showing one example of the functional configuration of the imaging system 100 according to Modified Example 1. As shown in FIGS. 5 and 6, the imaging controller 150A controls the operation of the unmanned flight vehicle 120 such that a distance between the end effector 230 of the robot 200 and the unmanned flight vehicle 120 becomes a first predetermined distance L1 or more. The imaging controller 150A controls the operation of the unmanned flight vehicle 120 such that the distance between the end effector 230 of the robot 200 and the unmanned flight vehicle 120 becomes a second predetermined distance L2 or less. The second predetermined distance L2 is larger than the first predetermined distance L1.

Moreover, when the imaging controller 150A needs to operate the unmanned flight vehicle 120 such that the distance between the end effector 230 and the unmanned flight vehicle 120 becomes less than the first predetermined distance L1, the imaging controller 150A performs such control that: the unmanned flight vehicle 120 is located away from the end effector 230 by the first predetermined distance L1 or more; and the imager 110 performs the zoom-up imaging. For example, the imaging controller 150A performs the above control when the imaging controller 150A receives from the imaging inputter 130 such a command or a correction command that the distance between the end effector 230 and the unmanned flight vehicle 120 becomes less than the first predetermined distance L1.

When the imaging controller 150A needs to operate the unmanned flight vehicle 120 such that the distance between the end effector 230 and the unmanned flight vehicle 120 exceeds the second predetermined distance L2, the imaging controller 150A performs such control that: the unmanned flight vehicle 120 is located away from the end effector 230 by the second predetermined distance L2 or less; and the imager 110 performs the zoom-back imaging. For example, the imaging controller 150A performs the above control when the imaging controller 150A receives from the imaging inputter 130 such a command or a correction command that the distance between the end effector 230 and the unmanned flight vehicle 120 exceeds the second predetermined distance L2.

Therefore, the imaging controller 150A controls the flight of the unmanned flight vehicle 120 such that the position of the unmanned flight vehicle 120 is maintained within an area A3 between an area A1 having a center at the end effector 230 and a radius L1 and an area A2 having a center at the end effector 230 and a radius L2. With this, the unmanned flight vehicle 120 is prevented from approaching and interfering with the robotic arm 210, and the unmanned flight vehicle 120 is also prevented from interfering with objects, such as a ceiling and a wall around the robotic arm 210.

A position posture calculating unit 152A of the imaging controller 150A includes the determining unit 1523 as a first determining unit and further includes a second determining unit 1524. The first determining unit 1523 determines the target position and target posture of the camera 111 and outputs them to the second determining unit 1524. Hereinafter, the "target position" and the "target posture" determined by the first determining unit 1523 are also called a "first target position" and a "first target posture," respectively.

The second determining unit 1524 receives the information of the position and posture of the end effector 230 from the first detecting unit 1521. The second determining unit 1524 calculates a distance Lce between the first target position of the camera 111 and the position of the end effector 230 and executes comparison between the distance Lce and the first predetermined distance L1 and comparison between the distance Lce and the second predetermined distance L2. Information of the first predetermined distance L1 and information of the second predetermined distance L2 are prestored in the storage unit 154. In the present modified example, a reference point of the position of the end effector 230 is an origin of the second coordinate system having the coordinate axes X2, Y2, and Z2. However, the position of the reference point may be any position of the end effector 230.

When the distance Lce is equal to or longer than the first predetermined distance L1 and the distance Lce is equal to or shorter than the second predetermined distance L2, the second determining unit 1524 executes first determination. In the first determination, the second determining unit 1524 determines the first target position and the first target posture as a second target position and a second target posture that are the target position and target posture of the camera 111 to be executed.

When the distance Lce is shorter than the first predetermined distance L1, the second determining unit 1524 executes second determination. In the second determination, the second determining unit 1524 determines as the second target position of the camera 111 a position that is located on a line connecting the first target position of the camera 111 and the position of the end effector 230 and is away from the end effector 230 by the first predetermined distance L1 or more. For example, the second determining unit 1524 determines a position of the first predetermined distance L1 as the second target position of the camera 111. Moreover, the second determining unit 1524 determines the first target posture as the second target posture of the camera 111.

When the distance Lce exceeds the second predetermined distance L2, the second determining unit 1524 executes third determination. In the third determination, the second determining unit 1524 determines as the second target position of the camera 111 a position that is located on the line connecting the first target position of the camera 111 and the position of the end effector 230 and is away from the end effector 230 by the second predetermined distance L2 or less. For example, the second determining unit 1524 determines a position of the second predetermined distance L2 as the second target position of the camera 111. Moreover, the second determining unit 1524 determines the first target posture as the second target posture of the camera 111.

The second determining unit 1524 outputs to the drive controlling unit 151 information containing the determination executed among the first to third determination, the first target position, the first target posture, the second target position, the second target posture, and the distance Lce.

The flight vehicle controlling unit 1512 of the drive controlling unit 151 generates an operation command for the unmanned flight vehicle 120, the operation command being a command that causes the unmanned flight vehicle 120 to move the camera 111 in accordance with the second target position and second target posture of the camera 111 which are received from the second determining unit 1524. The flight vehicle controlling unit 1512 outputs the operation command to the camera controlling unit 1511 and the flight vehicle controller 125 of the unmanned flight vehicle 120.

The camera controlling unit 1511 generates an operation command for the gimbal 112, the operation command being a command that causes the gimbal 112 to move the posture of the camera 111 in accordance with the second target posture of the camera 111 which is received from the second determining unit 1524. Moreover, the camera controlling unit 1511 determines zoom-up magnification or zoom-back magnification of the camera 111 by using the first target position and second target position of the camera 111 which are received from the second determining unit 1524.

Specifically, when the camera controlling unit 1511 receives the first determination, the camera controlling unit 1511 determines not to change the current zoom-up magnification and the current zoom-back magnification.

When the camera controlling unit 1511 receives the second determination, the camera controlling unit 1511 determines the zoom-up imaging of the camera 111. The camera controlling unit 1511 calculates a distance LT12 between the first target position and the second target position. The camera controlling unit 1511 determines the zoom-up magnification of the camera 111 by using the distance LT12 and the distance Lce between the first target position and the end effector 230. The zoom-up magnification is determined such that the size of the image of the end effector 230 in the image taken by the camera 111 that is located at the second target position and uses the zoom-up magnification and the size of the image of the end effector 230 in the image taken by the camera 111 that is located at the first target position and does not use the zoom-up magnification are equal to each other.

When the camera controlling unit 1511 receives the third determination, the camera controlling unit 1511 determines the zoom-back imaging of the camera 111. The camera controlling unit 1511 calculates the distance LT12 between the first target position and the second target position. The camera controlling unit 1511 determines the zoom-back magnification of the camera 111 by using the distance LT12 and the distance Lce between the first target position and the end effector 230. The zoom-back magnification is determined such that the size of the image of the end effector 230 in the image taken by the camera 111 that is located at the second target position and uses the zoom-back magnification and the size of the image of the end effector 230 in the image taken by the camera 111 that is located at the first target position and does not use the zoom-back magnification are equal to each other.

The camera controlling unit 1511 transmits to the camera controller 113 of the unmanned flight vehicle 120 the operation command for the gimbal 112 and the operation command for the camera 111 on which the determination results of the zoom-up magnification and zoom-back magnification of the camera 111 are reflected.

According to the above, even when the unmanned flight vehicle 120 is at a position corresponding to the second target position, the camera 111 can take the same image as when the unmanned flight vehicle 120 is at a position corresponding to the first target position, and the display structure 140 can display the image.

In the present modified example, the imaging controller 150A uses the first predetermined distance L1 and the second predetermined distance L2. However, the present modified example is not limited to this. The imaging controller 150A may use only one of the first predetermined distance L1 and the second predetermined distance L2.

For example, in the case of using only the first predetermined distance L1, the second determining unit 1524 executes the first determination when the distance Lce between the first target position of the camera 111 and the position of the end effector 230 is equal to or longer than the first predetermined distance L1. Moreover, the second determining unit 1524 executes the second determination when the distance Lce is shorter than the first predetermined distance L1. The second determining unit 1524 does not execute the third determination.

For example, in the case of using only the second predetermined distance L2, the second determining unit 1524 executes the first determination when the distance Lce is equal to or shorter than the second predetermined distance L2. Moreover, the second determining unit 1524 executes the third determination when the distance Lce is longer than the second predetermined distance L2. The second determining unit 1524 does not execute the second determination.

The second determining unit 1524 may increase or decrease the first predetermined distance L1, the second predetermined distance L2, or both the first predetermined distance L1 and the second predetermined distance L2 in accordance with the movement speed of the end effector 230. Specifically, the second determining unit 1524 may increase or decrease only the first predetermined distance L1 or may increase or decrease only the second predetermined distance L2. The second determining unit 1524 may increase or decrease both the first predetermined distance L1 and the second predetermined distance L2. In this case, the second determining unit 1524 may increase both the first predetermined distance L1 and the second predetermined distance L2, may decrease both the first predetermined distance L1 and the second predetermined distance L2, or may increase one of the first predetermined distance L1 and the second predetermined distance L2 and decrease the other. The second determining unit 1524 may detect the movement speed of the end effector 230 based on the information of the position and posture of the end effector 230 which are detected by the first detecting unit 1521. The first detecting unit 1521 may detect the movement speed of the end effector 230.

For example, when the movement speed of the end effector 230 increases, the second determining unit 1524 may change the first predetermined distance L1 so as to increase the first predetermined distance L1 and change the second predetermined distance L2 so as to decrease the second predetermined distance L2. With this, the unmanned flight vehicle 120 can be further surely prevented from contacting the robot 200 and peripheral objects.

For example, when the movement speed of the end effector 230 decreases, the second determining unit 1524 may change the first predetermined distance L1 so as to decrease the first predetermined distance L1 and change the second predetermined distance L2 so as to increase the second predetermined distance L2. With this, the unmanned flight vehicle 120 can approach the end effector 230 more closely.

For example, the second determining unit 1524 may increase or decrease the first predetermined distance L1 and the second predetermined distance L2 such that the first predetermined distance L1 and the second predetermined distance L2 are changed so as to follow the change of the movement speed of the end effector 230. Or, the second determining unit 1524 may determine whether to increase or decrease the first predetermined distance L1 and the second predetermined distance L2, based on the result of comparison between the movement speed of the end effector 230 and a threshold. In this case, the second determining unit 1524 may compare the movement speed of the end effector 230 with plural thresholds and stepwisely increase or decrease the first predetermined distance L1 and the second predetermined distance L2.

In the present modified example, the imaging controller 150A restricts the flight area of the unmanned flight vehicle 120 based on a relation between the target position of the camera 111 and the position of the end effector 230. However, the present modified example is not limited to this.

Figure 7:
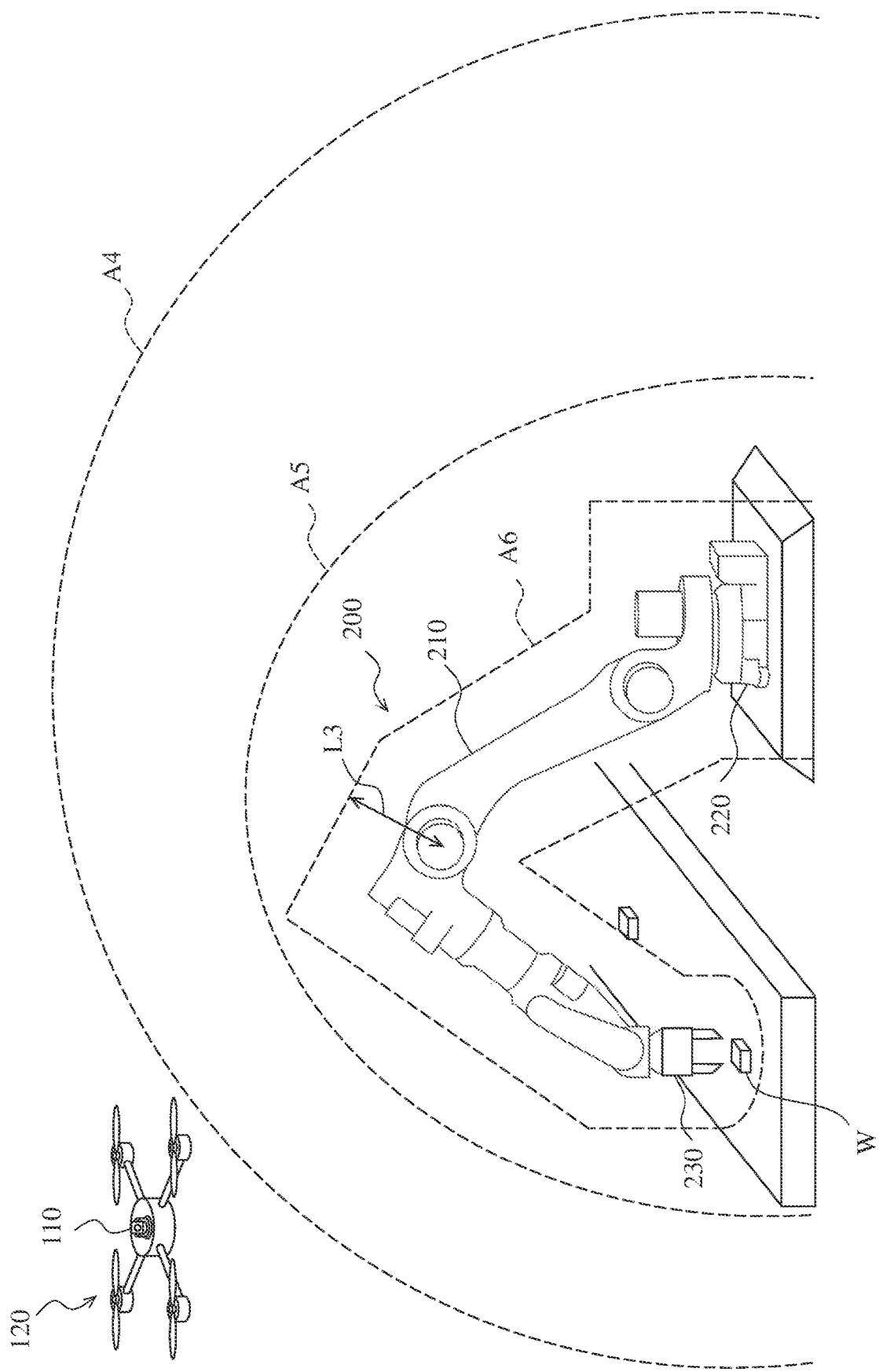
FIG. 7 is a perspective view showing another example of a flight restricted area of the unmanned flight vehicle according to Modified Example 1.

For example, FIG. 7 is a perspective view showing another example of the flight restricted area of the unmanned flight vehicle 120 according to Modified Example 1. As shown in FIG. 7, the imaging controller 150A may restrict the flight area based on a relation between a movable range A4 of the robot 200 and the target position of the camera 111 such that the unmanned flight vehicle 120 does not get into the movable range A4. The movable range A4 is a range where the robotic arm 210 of the robot 200 can move. When the target position of the camera 111 is within the movable range A4, the imaging controller 150A may perform the same control as when the distance between the end effector 230 and the unmanned flight vehicle 120 is shorter than the first predetermined distance L1.

The imaging controller 150A may restrict the flight area based on a relation between a work range A5 of the robot 200 and the target position of the camera 111 such that the unmanned flight vehicle 120 does not get into the work range A5. The work range A5 is a range where the robotic arm 210 may move when the robot 200 executes predetermined work. When the target position of the camera 111 is within the work range A5, the imaging controller 150A may perform the same control as when the distance between the end effector 230 and the unmanned flight vehicle 120 is shorter than the first predetermined distance L1.

The imaging controller 150A may restrict the flight area based on a relation between the robotic arm 210 and the target position of the camera 111 such that the unmanned flight vehicle 120 does not get into an arm area A6 that is an area spreading from the robotic arm 210 by a third predetermined distance L3 or less. The imaging controller 150A may detect the positions of the joints and other portions of the robotic arm 210 by using the feedback information of the joint drivers 212 of the robotic arm 210. Moreover, the imaging controller 150A may detect the position of the arm area A6 based on the detected positions.

The arm area A6 is an area surrounding the robotic arm 210 and changes so as to follow the operation of the robotic arm 210. In the present example, the arm area A6 is an area spreading from a rotational center axis of each joint 211 (see FIG. 1) of the robotic arm 210 by the third predetermined distance L3 or less. However, the present modified example is not limited to this. For example, the arm area A6 may be an area based on any portion of the robotic arm 210, such as a surface of the robotic arm 210. Moreover, in the present example, the arm area A6 is an area spreading over the entire robotic arm 210. However, the present modified example is not limited to this. For example, the arm area A6 may be an area spreading over at least a portion of the robotic arm 210, such as a portion in the vicinity of the end effector 230. When the target position of the camera 111 is within the arm area A6, the imaging controller 150A may perform the same control as when the distance between the end effector 230 and the unmanned flight vehicle 120 is shorter than the first predetermined distance L1.

The imaging controller 150A may separately perform: control of restricting the flight area of the unmanned flight vehicle 120 by using the first predetermined distance L1 and the second predetermined distance L2; control of restricting the flight area of the unmanned flight vehicle 120 by using the movable range A4; control of restricting the flight area of the unmanned flight vehicle 120 by using the work range A5; and control of restricting the flight area of the unmanned flight vehicle 120 by using the arm area A6, or may perform a combination of two or more of these control.

Modified Example 2

Modified Example 2 of the exemplary embodiment is different from the exemplary embodiment and Modified Example 1 in that: the imaging system 100 includes a movement detector 160 that detects the movement of a head H of the user P; and the position and posture of the camera 111 are changed so as to follow the movement of the head H which is detected by the movement detector 160. Hereinafter, in Modified Example 2, differences from the exemplary embodiment and Modified Example 1 will be mainly described, and the same explanations as the exemplary embodiment and Modified Example 1 are suitably omitted.

Figure 8:
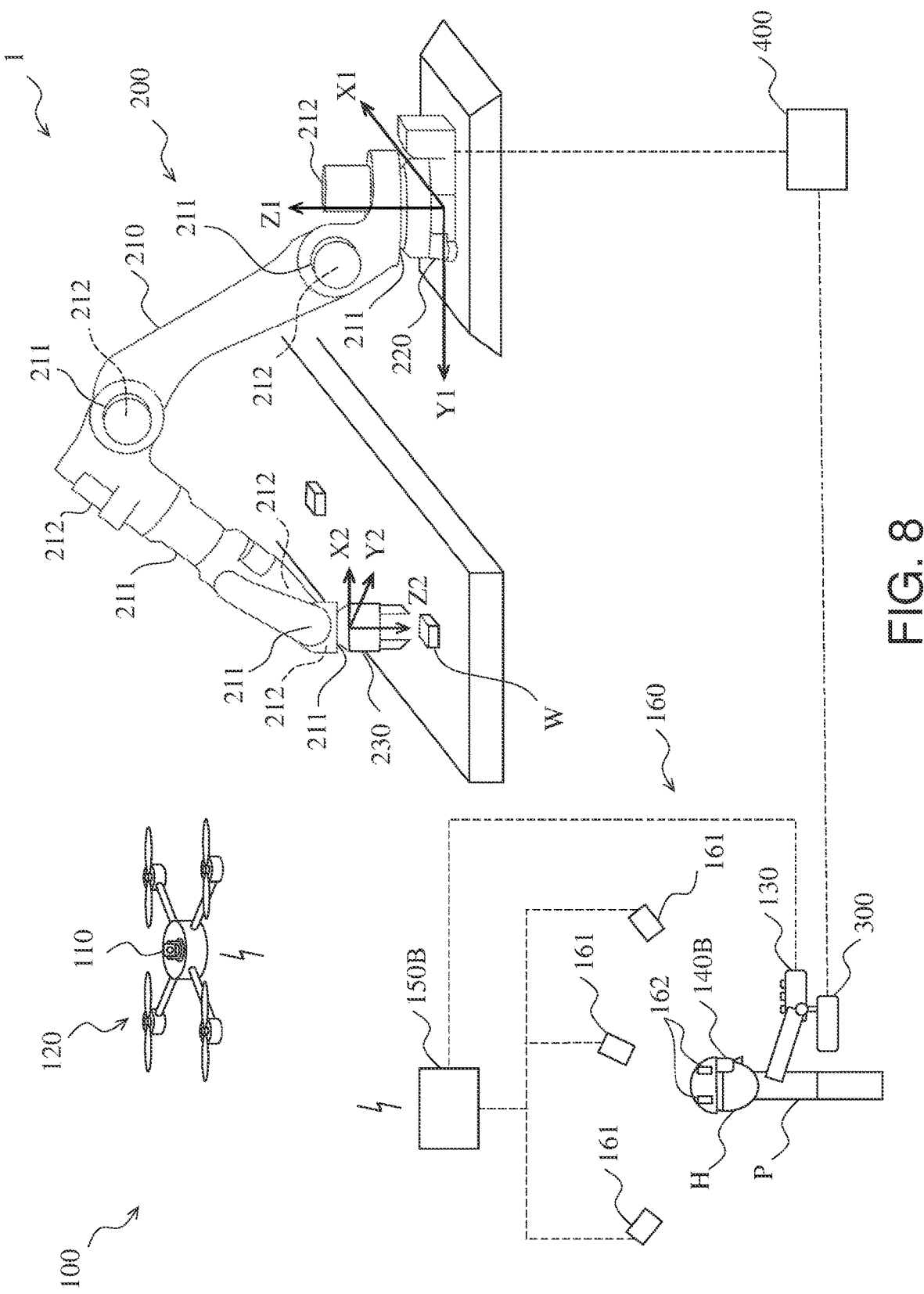
FIG. 8 is a perspective view showing one example of the configuration of the robot system according to Modified Example 2 of the exemplary embodiment.
Figure 9:
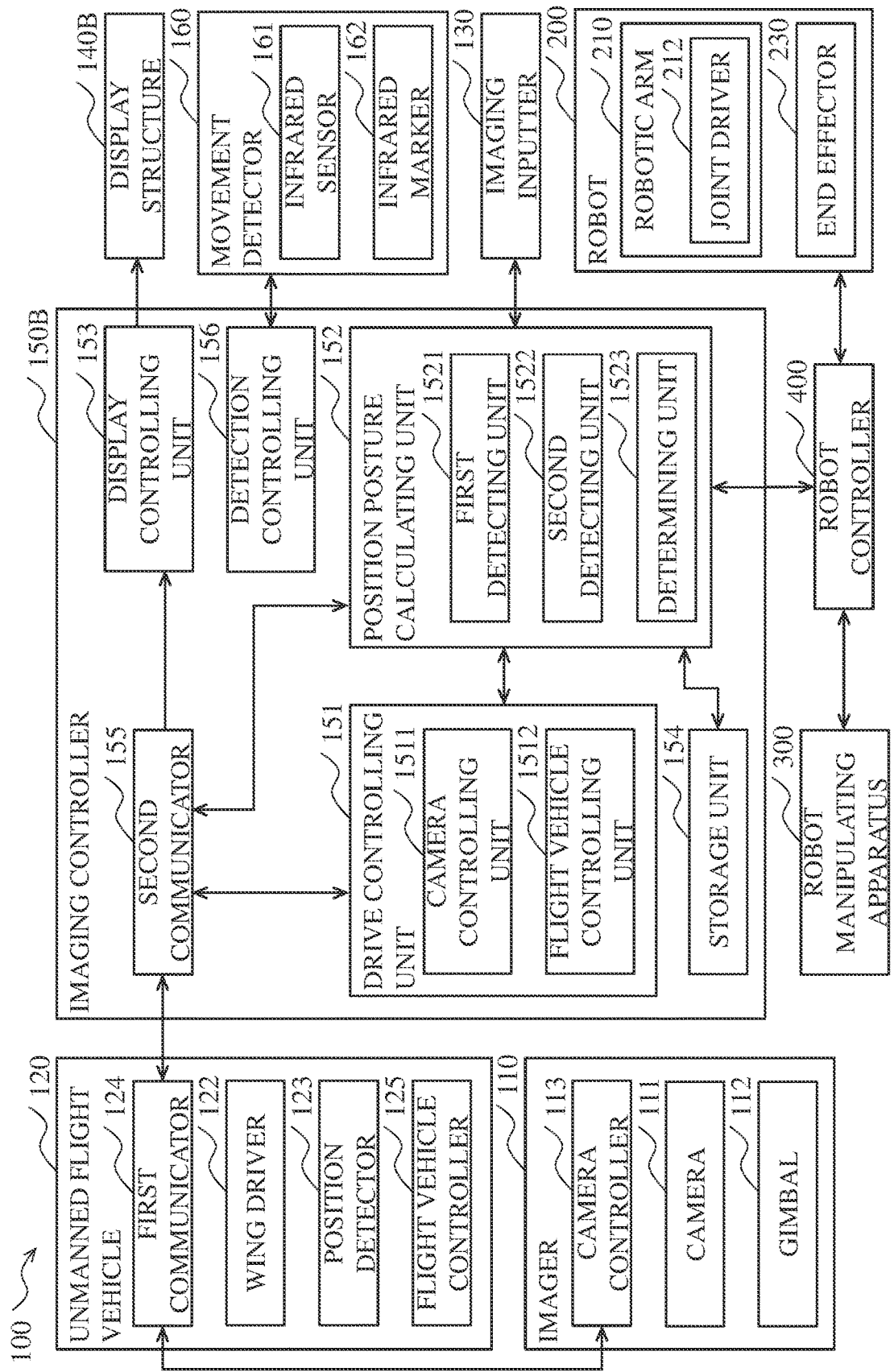
FIG. 9 is a block diagram showing one example of the functional configuration of the imaging system according to Modified Example 2.

FIG. 8 is a perspective view showing one example of the configuration of the robot system 1 according to Modified Example 2 of the exemplary embodiment. FIG. 9 is a block diagram showing one example of the functional configuration of the imaging system 100 according to Modified Example 2. As shown in FIGS. 8 and 9, the imaging system 100 includes a display structure 140B as the display structure and further includes the movement detector 160. Moreover, the imaging controller 150B of the imaging system 100 further includes a detection controlling unit 156.

The display structure 140B is a head mount display attached to the head H of the user P. In the present modified example, the head mount display has a goggles shape, and a lens of the head mount display includes a display surface that displays images. The display structure 140B moves together with the head H of the user P and with this, can change the position and direction of the image that is displayed by the display structure 140B so as to follow the movement of the head H of the user P.

The display structure 140B may have a structure where the display structure 140B is not attached to the head H of the user P. In this case, the display structure 140B may have a structure where the position of the display surface of the display structure 140B, the posture of the display surface of the display structure 140B, or both the position and posture of the display surface of the display structure 140B may be changeable. Or the display structure 140B may have a structure where the display surface of the display structure 140B may be fixed.

The movement detector 160 is one example of a detector and detects the movement of the head H of the user P. In the present modified example, the movement detector 160 includes at least one infrared sensor 161 and at least one infrared marker 162 mounted on the head H. However, the present modified example is not limited to this. In the present modified example, plural infrared sensors 161, specifically, three infrared sensors 161 are located around the user P so as to be directed toward the user P. The three infrared sensors 161 are located away from the head H of the user P. Plural infrared markers 162, specifically, four infrared markers 162 are located at different positions on the head H. The head includes a portion above a neck of a human body and may include, for example, a face, a top of the head, a side of the head, and a back of the head.

The infrared marker 162 emits infrared light. The infrared marker 162 may be a light emitter, such as an infrared LED (Light Emitting Diode), which emits infrared light, may be a reflector that reflects infrared light with which the reflector is irradiated, or may include both the light emitter and the reflector. The infrared sensor 161 can receive infrared light and detect the direction, intensity, intensity distribution, and the like of the received infrared light. The infrared sensor 161 may be able to merely receive infrared light or may be able to emit infrared light and receive infrared light, such as reflected light of the emitted infrared light. In the latter case, the infrared sensor 161 may be an infrared light camera. The infrared light from the four infrared markers 162 are detected by using the three infrared sensors 161, and with this, for example, the position and posture of the head H can be detected with a high degree of accuracy. The position of the head H may be a three-dimensional position of the head H, such as a three-dimensional position of a predetermined reference point of the head H, in a three-dimensional space. However, the present modified example is not limited to this. The posture of the head H may be the posture of a predetermined portion, a predetermined plane, or a predetermined axis, such as a front portion of the head H, a flat plane crossing the head H, or an axis extending from a jaw of the head H to the top of the head H. Specifically, the posture of the head H may be a three-dimensional direction of the predetermined portion, the predetermined plane, or the predetermined axis in a three-dimensional space.

Contrary to the above, the infrared sensor 161 may be mounted on the head H of the user P, and the infrared marker 162 may be at a position away from the head H of the user P. The positions of the infrared sensors 161, the number of infrared sensors 161, the positions of the infrared markers 162, and the number of infrared markers 162 are not especially limited as long as the position of the head H, the posture of the head H, both the position and posture of the head H, or the like can be detected.

The detection controlling unit 156 controls driving of the three infrared sensors 161 and processes detection results of the infrared light emitted from the four infrared markers 162 and detected by the three infrared sensors 161, to detect the three-dimensional positions and three-dimensional postures of the four infrared markers 162. To be specific, the detection controlling unit 156 detects the three-dimensional positions and three-dimensional postures of the infrared markers 162 to detect the position and posture of the head H of the user P. The detection controlling unit 156 outputs the information of the position and posture of the head H to the position posture calculating unit 152.

Specifically, each of the three infrared sensors 161 receives the infrared light emitted from the four infrared markers 162. The infrared light emitted from each infrared marker 162 is associated with identification information, such as an ID set for the infrared marker 162. Therefore, each infrared sensor 161 can detect the direction, intensity, intensity distribution, and the like of the infrared light of each of the four infrared markers 162. The detection controlling unit 156 detects the three-dimensional positions of the four infrared markers 162 by using the information of the three-dimensional positions and three-dimensional postures of the infrared sensors 161 which is prestored in the storage unit 154 and detection results of the infrared light emitted from the four infrared markers 162 and detected by the infrared sensors 161. For example, the detection controlling unit 156 detects the three-dimensional positions of the four infrared markers 162 in accordance with the first coordinate system. Moreover, the detection controlling unit 156 detects the three-dimensional position and three-dimensional posture of the head H of the user P by using the information of the three-dimensional positions of the four infrared markers 162. For example, the detection controlling unit 156 expresses the posture by using posture angles, such as a rolling angle, a pitching angle, and a yawing angle.

The position posture calculating unit 152 determines the target position and target posture of the camera 111 by using the information of the position and posture of the head H as a command to move the position and posture of the camera 111, as with the command that is input to the imaging inputter 130 and is a command to move the position and posture of the camera 111 in the exemplary embodiment. The position posture calculating unit 152 determines the target position and target posture of the camera 111 which are used to move the camera 111 based on change amounts of the position and posture of the camera 111, the change amounts corresponding to change amounts of the position and posture of the head H.

For example, the movement of the head H in the horizontal direction and the movement of the head H in the vertical direction are respectively associated with the movement of the camera 111 in the horizontal direction and the movement of the camera 111 in the vertical direction. The movement of the head H in the rolling direction, the movement of the head H in the pitching direction, and the movement of the head H in the yawing direction are respectively associated with the movement of the camera 111 in the rolling direction, the movement of the camera 111 in the pitching direction, and the movement of the camera 111 in the direction.

The determining unit 1523 of the position posture calculating unit 152 calculates the target position and target posture of the camera 111 from the information of the position and posture of the head H. For example, the storage unit 154 stores a relation of various parameters that are used to move the respective devices in accordance with the movement of the head H of the user P. For example, the storage unit 154 stores a change relation that is a relation between the change amounts of the position and posture of the head H and the change amounts of the position and posture of the camera 111. By using the information of the position and posture of the head H and the change relation, the determining unit 1523 determines the target position and target posture of the camera 111 which are used to move the camera 111 such that the camera 111 follows the movement of the head H. Herein, the information of the position and posture of the head H contains information of the position and posture of the head H moved by the user P with respect to the operating robot 200 in order that the user P visually confirms a portion of the operating robot 200, such as the end effector 230, through the camera 111.

When the determining unit 1523 receives information (hereinafter also called "head operation information") indicating the changes of the position and posture of the head H of the user P from the detection controlling unit 156 during execution of the control of determining the target position and target posture of the camera 111 by using the predetermined relative relation, the determining unit 1523 may prioritize control of determining the target position and target posture of the camera 111 in accordance with the head operation information. To be specific, the determining unit 1523 receives the head operation information as the correction command that is a command to correct the position and direction of the camera 111, and the determining unit 1523 changes the target position and target direction of the camera 111 which correspond to the predetermined relative relation to the target position and target direction of the camera 111 which are determined in accordance with the head operation information. With this, the target position and target posture of the camera 111 which are determined by using the predetermined relative relation are corrected by the target position and target posture of the camera 111 which are determined in accordance with the changes of the position and posture of the head H. To be specific, the user P can move the head H to correct the target position and target posture of the camera 111 to the intended position and intended posture.

Instead of the target position and target posture of the camera 111 which are determined by using the predetermined relative relation, the determining unit 1523 may determine the target position and target posture of the camera 111 which are determined in accordance with the head operation information, as the corrected target position and corrected target posture of the camera 111. The determining unit 1523 may determine, as the corrected target position and corrected target posture of the camera 111, the target position and target posture of the camera 111 which are generated by adding the target position and target posture of the camera 111 which are determined in accordance with the head operation information to the target position and target posture of the camera 111 which are determined by using the predetermined relative relation.

After the correction of the target position and target direction of the camera 111, the determining unit 1523 may reflect the result of the correction on the determination of the target position and target direction of the camera 111 which correspond to the predetermined relative relation. Or, after the correction of the target position and target direction of the camera 111, the determining unit 1523 may determine the target position and target posture of the camera 111 without reflecting the result of the correction on the predetermined relative relation.

Figure 10:
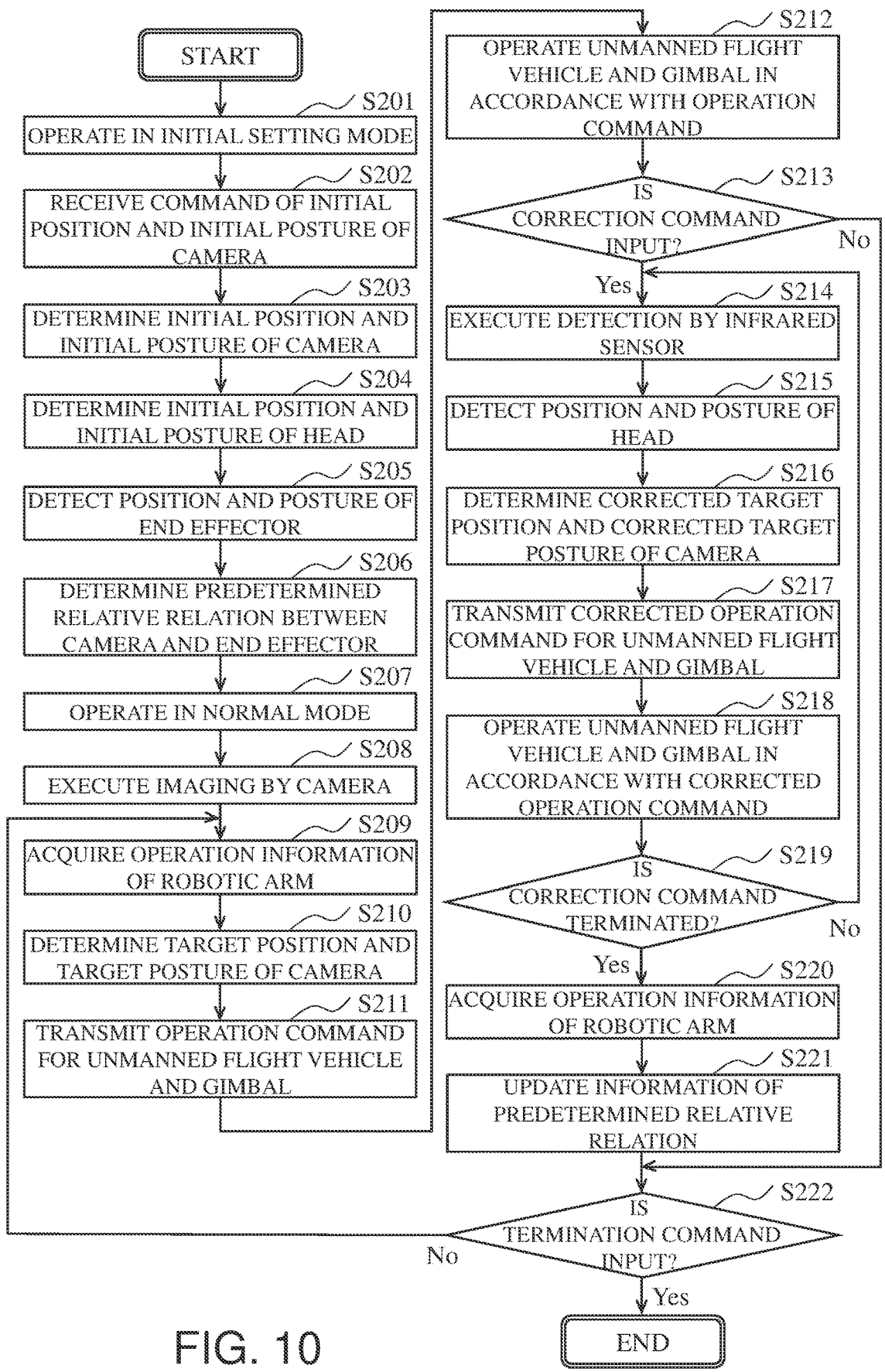
FIG. 10 is a flowchart showing one example of the operation of the imaging system according to Modified Example 2.

The operation of the imaging system 100 according to Modified Example 2 will be described. FIG. 10 is a flowchart showing one example of the operation of the imaging system 100 according to Modified Example 2. As shown in FIG. 10, first, in Step S201, the imaging controller 150B operates in the initial setting mode in which the predetermined relative relation between the end effector 230 of the robot 200 and the camera 111 of the imager 110, the initial position and initial posture of the camera 111, and the initial position and initial posture of the head H of the user P are determined.

Next, Steps S202 and S203 are the same as Steps S102 and S103 of the exemplary embodiment.

Next, in Step S204, the imaging controller 150B determines the initial position and initial posture of the head H of the user P. Specifically, when the position and posture of the head H become the desired position and the desired posture, the user P inputs to the imaging inputter 130 a command to determine the initial position and initial posture of the head H. The imaging controller 150B causes the three infrared sensors 161 of the movement detector 160 to perform the detection operation of the infrared light. The imaging controller 150B processes the detection results of the infrared sensors 161 to detect the position and posture of the head H. The imaging controller 150B determines the detected position and detected posture of the head H as the initial position and initial posture of the head H.

Next, Steps S205 to S212 are the same as Steps S104 to S111 of the exemplary embodiment.

Next, in Step S213, the imaging controller 150B determines whether or not the correction command, which is a command to correct the position and posture of the camera 111 so as to follow the movement of the head H, has been input to the imaging inputter 130 by the user P. When the correction command has already been input (Yes in Step S213), the imaging controller 150B proceeds to Step S214. When the correction command has not yet been input (No in Step S213), the imaging controller 150B proceeds to Step S222.

In Step S214, the imaging controller 150B causes the three infrared sensors 161 to continuously execute the detection of the infrared light of the infrared markers 162 of the head H. The imaging controller 150B may start Step S214 at any timing in a period from after Step S207 until after Step S213.

Next, in Step S215, the user P moves the head H to the desired position and the desired posture while visually confirming the display structure 140B. For example, the user P moves the head H such that the position and posture of the end effector 230 displayed on the display structure 140B become the position and posture that the user P wants to see. The imaging controller 150B processes the detection results of the infrared sensors 161 and detects the position and posture of the head H of the user P relative to the initial position and the initial posture. The imaging controller 150B detects the position and posture of the head H at a predetermined time interval.

Next, in Step S216, the imaging controller 150B determines, as the corrected target position and corrected target posture of the camera 111, the target position and target posture of the camera 111 which are used to move the position and posture of the camera 111 in accordance with the detected position and detected posture of the head H. The imaging controller 150B calculates the corrected target position and corrected target posture of the camera 111 based on the information of the detected position and detected posture of the head H and the change relation stored in the storage unit 154.

Next, in Step S217, the imaging controller 150B determines the corrected target position and corrected target posture of the unmanned flight vehicle 120 and the corrected target operating states of the respective portions of the gimbal 112 which are used to move the position and posture of the camera 111 to the corrected target position and corrected target posture of the camera 111. The imaging controller 150B transmits a corrected operation command that causes the unmanned flight vehicle 120 to move to the corrected target position and the corrected target posture and a corrected operation command that causes the gimbal 112 to operate into the corrected target operating state, to the unmanned flight vehicle 120 and the imager 110.

Next, in Step S218, the unmanned flight vehicle 120 moves to the corrected target position and the corrected target posture in accordance with the corrected operation command, and the imager 110 operates the gimbal 112 in the corrected target operating state in accordance with the corrected operation command.

Next, in Step S219, the imaging controller 150B determines whether or not the user P has provided the imaging inputter 130 an input for terminating the correction command. When the input has already been provided (Yes in Step S219), the imaging controller 150B proceeds to Step S220. When the input has not yet been provided (No in Step S219), the imaging controller 150B returns to Step S214.

Steps S220 and S221 are the same as Steps S115 and S116 of the exemplary embodiment.

Next, in Step S222, the imaging controller 150B determines whether or not a command to terminate the operation of the imaging system 100 has been input to the imaging inputter 130 by the user P. When the command has already been input (Yes in Step S222), the imaging controller 150B terminates the processing. When the command has not yet been input (No in Step S222), the imaging controller 150B returns to Step S209.

Through Steps S201 to S222, the imaging controller 150B corrects the relative positional relation based on the position and posture of the camera 111 which is moved so as to follow the movement of the head H of the user P. Therefore, the user P can easily determine the relative positional relation more desirable for the user P by moving the head H to the desired position and the desired direction.

In Modified Example 2, when the imaging controller 150B receives the correction command of the position and posture of the camera 111 during the control of the operations of the unmanned flight vehicle 120 and the gimbal 112 in accordance with the relative positional relation, the imaging controller 150B corrects the relative positional relation such that the relative positional relation corresponds to the position and posture of the camera 111 that moves so as to follow the movement of the head H of the user P. However, Modified Example 2 is not limited to this. For example, the imaging controller 150B may be configured to correct the position and posture of the camera 111 so as to follow the movement of the head H but not to correct the relative positional relation. In this case, the imaging controller 150B temporarily corrects the position and posture of the camera 111 so as to follow the movement of the head H, and then, controls the position and posture of the camera 111 in accordance with the existing relative positional relation. Moreover, the imaging controller 150B may determine the presence or absence of the correction of the relative positional relation in accordance with a command of the user P through the imaging inputter 130.

In Modified Example 2, the imaging controller 150B may use both the control of moving the position and posture of the camera 111 in accordance with manipulation using the imaging inputter 130 and the control of causing the position and posture of the camera 111 to follow the movement of the head H of the user P. The configuration of the imaging system 100 according to Modified Example 2 may be applied to Modified Example 1.

Other Embodiments

The foregoing has described the exemplary embodiment and the modified examples according to the present disclosure. However, the present disclosure is not limited to the above exemplary embodiment and the above modified examples. To be specific, various modifications and improvements may be made within the scope of the present disclosure. For example, modes prepared by variously modifying the exemplary embodiment and the modified examples and modes prepared by combining components in different exemplary embodiments and modified examples are within the scope of the present disclosure.

For example, in the exemplary embodiment and the modified examples, each of the imaging controller 150, 150A, and 150B controls the operations of the unmanned flight vehicle 120 and the gimbal 112 in accordance with the relative positional relation. However, the exemplary embodiment and the modified examples are not limited to this. For example, without using the relative positional relation, each of the imaging controller 150, 150A, and 150B may control the operations of the unmanned flight vehicle 120 and the gimbal 112 in accordance with a command of the position and posture of the camera 111 which is input to the imaging inputter 130 by the user P and/or may control the operations of the unmanned flight vehicle 120 and the gimbal 112 such that the position and posture of the camera 111 follow the movement of the head H of the user P.

In Modified Example 2, the movement detector 160 includes the infrared sensors 161 and the infrared markers 162 in order to detect the movement of the head H of the user P. However, Modified Example 2 is not limited to this. The movement detector 160 may include any configuration that can detect the movement of the head H.

For example, the movement detector 160 may include an acceleration sensor and an angular velocity sensor which are attached to the head H, and may detect acceleration and angular velocities in six axial directions of the head H. In this case, the imaging controller 150B may receive detection results from the acceleration sensor and the angular velocity sensor through wired communication or wireless communication. The imaging controller 150B may detect the position and posture of the head H by using the detection results of the acceleration and the angular velocities.

Or, the movement detector 160 may include a three-dimensional camera located at a position away from the head H and take a three-dimensional image of the head H. A pixel value of each pixel of the three-dimensional image indicates a distance to a subject shown on the pixel. In this case, by image processing, such as a pattern matching method using a template of the head H, the imaging controller 150B may detect the image of the head H and the posture of the head H in the three-dimensional image. The imaging controller 150B may detect the position of the head H from the pixel values of the pixels of the three-dimensional image. Moreover, the movement detector 160 may include three-dimensional cameras that are located at different positions and are directed in different directions. The imaging controller 150B may process the three-dimensional images of the three-dimensional cameras to generate a three-dimensional model of the head H. The imaging controller 150B may detect the position and posture of the head H by using the three-dimensional model of the head H.

Or, the movement detector 160 may include a magnetic field generator and a magnetic sensor which is attached to the head H, and may detect the position and posture of the magnetic sensor. In this case, the imaging controller 150B may receive detection results from the magnetic sensor through wired communication or wireless communication. The imaging controller 150B may detect the position and posture of the head H by using the detection results of the position and posture of the magnetic sensor.

Examples of aspects of the technology of the present disclosure are as below. An imaging system according to one aspect of the present disclosure includes: an unmanned flight vehicle; an imager that is mounted on the unmanned flight vehicle and takes an image of a robot which performs work with respect to a target object; a display structure that is located away from the unmanned flight vehicle and displays the image taken by the imager to a user who manipulates the robot; and a controller that controls operations of the imager and the unmanned flight vehicle. The controller acquires operation related information that is information related to an operation of the robot. The controller moves the unmanned flight vehicle such that a position and direction of the imager are changed so as to correspond to the operation related information.

According to the above aspect, the imaging system uses the operation related information related to the manipulation of the robot in order to control the movement of the unmanned flight vehicle. With this, the manipulation of the user for manipulating the unmanned flight vehicle can be simplified, and the manipulation amount can be reduced. Therefore, the imaging system can simplify the manipulation of the unmanned flight vehicle on which the imager is mounted.

In the imaging system according to the aspect of the present disclosure, the controller may acquire, as the operation related information, operation information indicating the operation of the robot. The controller may move the unmanned flight vehicle such that the position and direction of the imager are changed in accordance with the operation information.

According to the above aspect, the imaging system uses the operation information of the robot in order to control the movement of the unmanned flight vehicle. For example, the imaging system can control the movement of the unmanned flight vehicle such that the unmanned flight vehicle moves so as to follow the operation of the robot. With this, the manipulation of the unmanned flight vehicle by the user can be simplified, and the manipulation amount can be reduced.

The imaging system according to the aspect of the present disclosure may further include an inputter that receives input of a command from the user. The controller may receive, through the inputter, a correction command that is a command to correct the position and direction of the imager. The controller may move the unmanned flight vehicle such that the position and direction of the imager which correspond to the operation related information are changed to the position and direction of the imager in accordance with the correction command.

According to the above aspect, the imaging system can correct, in accordance with the correction command received through the inputter, the movement of the unmanned flight vehicle which changes the position and direction of the imager in accordance with the operation related information. The imaging system may use the position and direction of the imager which are determined in accordance with the correction command instead of the position and direction of the imager which correspond to the operation related information. The imaging system may use the position and direction of the imager which are generated by adding the position and direction of the imager which are determined in accordance with the correction command to the position and direction of the imager which correspond to the operation related information. In both cases, the user can correct the position and direction of the imager to the intended position and intended direction.

In the imaging system according to the aspect of the present disclosure, after the position and direction of the imager are changed in accordance with the correction command, the controller may reflect result of the change of the position and direction of the imager in accordance with the correction command on the position and direction of the imager which correspond to the operation related information.

According to the above aspect, the imaging system can reflect the correction corresponding to the correction command on the control of the movement of the unmanned flight vehicle after the correction. Therefore, the imaging system can move the unmanned flight vehicle such that the position and direction of the imager are changed so as to correspond to the operation related information while reflecting the intention of the user on the position and direction of the imager.

The imaging system according to the aspect of the present disclosure may further include a detector that detects a movement of a head of the user. The controller may acquire information of the movement of the head of the user from the detector. The controller may move the unmanned flight vehicle such that the position and direction of the imager are changed so as to follow the movement of the head of the user.

According to the above aspect, the imaging system uses the information of the movement of the head of the user in order to control the movement of the unmanned flight vehicle. The imaging system may use the position and direction of the imager which follows the movement of the head of the user instead of the position and direction of the imager which correspond to the operation related information. The imaging system may use the position and direction of the imager which are generated by adding the position and direction of the imager which follows the movement of the head of the user to the position and direction of the imager which correspond to the operation related information. In both cases, the manipulation of the unmanned flight vehicle by the user can be simplified, and the manipulation amount can be reduced. For example, the user may move the head in such a direction that the user intends to see by such a movement distance that the user intends to see, to move the imager in the corresponding direction by the corresponding movement distance. Thus, the user can see the intended image.

In the imaging system according to the aspect of the present disclosure, the robot may include an end effector and a robotic arm that moves the end effector. The controller may acquire, as the operation related information, information of a position and direction of the end effector. The controller may move the unmanned flight vehicle such that the position and direction of the imager are changed so as to follow the position and direction of the end effector.

According to the above aspect, the user manipulates the robot to change the position and direction of the end effector, and with this, can cause the unmanned flight vehicle to change the position and direction of the imager. Thus, the manipulation of the unmanned flight vehicle by the user can be simplified, and the manipulation amount can be reduced. For example, when the imager takes the image of the end effector, the imager moves in accordance with the changes of the position and direction of the end effector. Therefore, the imager can continuously take the image of the end effector and display the image on the display structure. For example, even when the moving end effector goes behind the robotic arm in the case of image taking from a fixed position, the imager can avoid interference with the robotic arm and take the image of the end effector.

In the imaging system according to the aspect of the present disclosure, the controller may control the operation of the unmanned flight vehicle based on the information of the position and direction of the end effector such that a distance between the end effector and the unmanned flight vehicle becomes a first predetermined distance or more.

According to the above aspect, the imaging system controls the movement of the unmanned flight vehicle such that the unmanned flight vehicle does not get into a region spreading from the end effector by less than the first predetermined distance. Therefore, the imaging system can prevent the unmanned flight vehicle from contacting the end effector and the robotic arm.

In the imaging system according to the aspect of the present disclosure, when the controller receives such a command that the distance between the end effector and the unmanned flight vehicle becomes less than the first predetermined distance, the controller may perform such control that: the unmanned flight vehicle is located away from the end effector by the first predetermined distance or more; and the imager performs zoom-up imaging.

According to the above aspect, when the unmanned flight vehicle needs to move to a target position away from the end effector by less than the first predetermined distance, the imaging system can cause the imager to take the same image as when the imager takes the image at the target position, while preventing the unmanned flight vehicle from getting into the region spreading from the end effector by less than the first predetermined distance.

In the imaging system according to the aspect of the present disclosure, the controller may increase or decrease the first predetermined distance in accordance with a movement speed of the end effector, the movement speed being based on the information of the position and direction of the end effector.

According to the above aspect, since the unmanned flight vehicle moves so as to follow the position and direction of the end effector, the movement speed of the unmanned flight vehicle increases or decreases in the same way as the movement speed of the end effector. By increasing or decreasing the first predetermined distance in accordance with the movement speed of the end effector, the imaging system can surely prevent the unmanned flight vehicle from contacting the end effector and the robotic arm. For example, when the movement speed of the end effector increases, the first predetermined distance may be increased. Moreover, when the movement speed of the end effector decreases, the first predetermined distance may be decreased. When the robot performs precise work by using the end effector, the movement speed of the end effector tends to become lower, and the unmanned flight vehicle can approach the end effector more closely.

In the imaging system according to the aspect of the present disclosure, the controller may control the operation of the unmanned flight vehicle based on the information of the position and direction of the end effector such that a distance between the end effector and the unmanned flight vehicle becomes a second predetermined distance or less.

According to the above aspect, the imaging system controls the movement of the unmanned flight vehicle such that the unmanned flight vehicle does not get into a region away from the end effector by more than the second predetermined distance. Therefore, the imaging system can prevent the unmanned flight vehicle from contacting peripheral objects. The second predetermined distance may be larger than the first predetermined distance.

In the imaging system according to the aspect of the present disclosure, when the controller receives such a command that the distance between the end effector and the unmanned flight vehicle exceeds the second predetermined distance, the controller may perform such control that: the unmanned flight vehicle is located away from the end effector by the second predetermined distance or less; and the imager performs zoom-back imaging.

According to the above aspect, when the unmanned flight vehicle needs to move to a target position away from the end effector by more than the second predetermined distance, the imaging system can cause the imager to take the same image as when the imager takes the image at a target position, while preventing the unmanned flight vehicle from getting into a region away from the end effector by more than the second predetermined distance.

In the imaging system according to the aspect of the present disclosure, the controller may increase or decrease the second predetermined distance in accordance with a movement speed of the end effector, the movement speed being based on the information of the position and direction of the end effector.

According to the above aspect, by increasing or decreasing the second predetermined distance in accordance with the movement speed of the end effector, the imaging system can more surely prevent the unmanned flight vehicle from contacting peripheral objects. For example, when the movement speed of the end effector increases, the second predetermined distance may be decreased. Moreover, when the movement speed of the end effector decreases, the second predetermined distance may be increased.

A robot system according to one aspect of the present disclosure includes the imaging system according to the aspect of the present disclosure and the robot. According to the above aspect, the same effect as the imaging system according to one aspect of the present disclosure are obtained.

All the numerals, such as the ordinal numbers and the quantities, are examples used to specifically describe the technique of the present disclosure, and the present disclosure is not limited to these numerals. Connection relations among the components are examples used to specifically describe the technique of the present disclosure, and the connection relations that realize the functions of the present disclosure are not limited to these.

The scope of the present disclosure is defined by not the description but the claims attached hereto such that the present disclosure is carried out in various ways within the scope of the essential features of the present disclosure. Therefore, the exemplary embodiment and the modified examples are exemplary embodiments and examples and are not limiting the present disclosure. All changes that come within the claims and the scope of the claims or equivalents in claims and the scope of the claims intend to be covered by the claims.

The invention claimed is:

1. An imaging system comprising:
    an unmanned flight vehicle;
    an imager mounted to the unmanned flight vehicle, the imager capturing an image of a robot comprising a robot arm and an end effector, which performs work with respect to a target object;
    a display structure located away from the unmanned flight vehicle, the display structure displaying the image taken by the imager; and
    circuitry that controls, during an initial setting mode and a normal operating mode, operations of the imager and the unmanned flight vehicle, wherein the circuitry:
    acquires operation related information related to an operation of the robot, the operation related information comprising a position and a posture of the end effector;
    determining a predetermined relative relation to be maintained between the unmanned flight vehicle and the end effector by obtaining, during the initial setting mode, an initial position and an initial direction of the imager and calculating the predetermined relative relation based on the initial posture and the initial direction and the position and posture of the end effector, and terminating the initial setting mode;
    calculating a target position and target direction of the imager that maintains the relative relation based on the operation related information; and
    moving the unmanned flight vehicle such that a position and direction of the imager are changed so as to correspond to the target position and direction and maintain the relative relation based on the operation related information.

2. The imaging system according to claim 1, further comprising an inputter that receives input of a command, wherein:
    the circuitry receives, through the inputter, a correction command that is a command to correct the position and direction of the imager; and
    the circuitry moves the unmanned flight vehicle such that the position and direction of the imager which correspond to the operation related information are changed to the position and direction of the imager in accordance with the correction command.

3. The imaging system according to claim 2, wherein after the position and direction of the imager are changed in accordance with the correction command, the circuitry reflects result of the change of the position and direction of the imager in accordance with the correction command on the position and direction of the imager which correspond to the operation related information.

4. The imaging system according to claim 1, further comprising a detector that detects a movement of a head of a user, wherein:
    the circuitry acquires information of the movement of the head of the user from the detector; and
    the circuitry moves the unmanned flight vehicle such that the position and direction of the imager are changed so as to follow the movement of the head of the user.

5. The imaging system according to claim 1, wherein the circuitry controls the operation of the unmanned flight vehicle based on the information of the position and direction of the end effector such that the relative relation between the end effector and the unmanned flight vehicle becomes a first predetermined distance or more.

6. The imaging system according to claim 5, wherein when the circuitry receives a command such that the relative relation between the end effector and the unmanned flight vehicle becomes less than the first predetermined distance, the circuitry performs such control that: the unmanned flight vehicle is located away from the end effector by the first predetermined distance or more; and the imager performs zoom-up imaging.

7. The imaging system according to claim 5, wherein the circuitry increases or decreases the first predetermined distance in accordance with a movement speed of the end effector, the movement speed being based on the information of the position and direction of the end effector.

8. The imaging system according to claim 1, wherein the circuitry controls the operation of the unmanned flight vehicle based on the information of the position and direction of the end effector such that a distance between the end effector and the unmanned flight vehicle becomes a second predetermined distance or less.

9. The imaging system according to claim 8, wherein when the circuitry receives a command such the distance between the end effector and the unmanned flight vehicle exceeds the second predetermined distance, the circuitry performs such control that: the unmanned flight vehicle is located away from the end effector by the second predetermined distance or less; and the imager performs zoom-back imaging.

10. The imaging system according to claim 8, wherein the circuitry increases or decreases the second predetermined distance in accordance with a movement speed of the end effector, the movement speed being based on the information of the position and direction of the end effector.

11. A robot system comprising:
the imaging system according to claim 1; and
the robot.

* * * * *